(12) United States Patent
Machida et al.

(10) Patent No.: US 8,513,378 B2
(45) Date of Patent: Aug. 20, 2013

(54) PRODUCTION METHOD FOR WATER-ABSORBING RESIN POWDER

(75) Inventors: Sayaka Machida, Himeji (JP); Kazushi Torii, Himeji (JP); Yoko Shirai, Himeji (JP); Hiroyuki Ikeuchi, Himeji (JP); Kunihiko Ishizaki, Himeji (JP)

(73) Assignee: Nippon Shokubai Co., Ltd., Osaka (JP)

( * ) Notice: Subject to any disclaimer, the term of this patent is extended or adjusted under 35 U.S.C. 154(b) by 0 days.

(21) Appl. No.: 13/496,440

(22) PCT Filed: Sep. 16, 2010

(86) PCT No.: PCT/JP2010/066081
§ 371 (c)(1),
(2), (4) Date: May 14, 2012

(87) PCT Pub. No.: WO2011/034147
PCT Pub. Date: Mar. 24, 2011

(65) Prior Publication Data
US 2012/0220745 A1    Aug. 30, 2012

(30) Foreign Application Priority Data

Sep. 16, 2009 (JP) ................. 2009-214820
Sep. 16, 2009 (JP) ................. 2009-214960

(51) Int. Cl.
*C08G 64/00* (2006.01)
*C08G 63/02* (2006.01)

(52) U.S. Cl.
USPC ........ 528/480; 524/832; 526/317.1; 528/481; 528/502

(58) Field of Classification Search
USPC ............. 524/832; 526/317.1; 528/480, 481, 528/502
See application file for complete search history.

(56) References Cited

U.S. PATENT DOCUMENTS

| | | |
|---|---|---|
| 4,703,067 A | 10/1987 | Mikita et al. |
| 5,002,986 A | 3/1991 | Fujiura et al. |
| 5,118,719 A | 6/1992 | Lind |
| 5,124,188 A | 6/1992 | Roe et al. |
| 5,154,713 A | 10/1992 | Lind |
| 5,314,420 A | 5/1994 | Smith et al. |
| 5,399,591 A | 3/1995 | Smith et al. |
| 5,451,613 A | 9/1995 | Smith et al. |
| 5,462,972 A | 10/1995 | Smith et al. |
| 5,505,718 A | 4/1996 | Roe et al. |
| 5,562,646 A | 10/1996 | Goldman et al. |
| 5,712,316 A | 1/1998 | Dahmen et al. |
| 5,856,370 A | 1/1999 | Chmelir |
| 5,985,944 A | 11/1999 | Ishizaki et al. |
| 6,107,358 A | 8/2000 | Harada et al. |
| 6,136,873 A | 10/2000 | Haehnle et al. |
| 6,187,872 B1 * | 2/2001 | Yanase et al. ............. 525/330.2 |
| 6,291,636 B1 | 9/2001 | Miyake et al. |
| 6,414,214 B1 | 7/2002 | Engelhardt et al. |
| 6,562,879 B1 | 5/2003 | Hatsuda et al. |
| 6,565,768 B1 | 5/2003 | Dentler et al. |
| 6,576,713 B2 * | 6/2003 | Ishizaki et al. ............. 525/329.7 |
| 6,641,064 B1 | 11/2003 | Dentler et al. |
| 6,716,894 B2 * | 4/2004 | Kajikawa et al. ............. 522/150 |
| 6,727,345 B2 * | 4/2004 | Kajikawa et al. ......... 528/502 R |
| 6,750,262 B1 | 6/2004 | Haehnle et al. |
| 6,817,557 B2 | 11/2004 | Kakita et al. |
| 6,849,665 B2 | 2/2005 | Frenz et al. |
| 6,939,914 B2 | 9/2005 | Qin et al. |
| 7,169,843 B2 | 1/2007 | Smith et al. |
| 7,173,086 B2 | 2/2007 | Smith et al. |
| 2002/0128618 A1 | 9/2002 | Frenz et al. |
| 2003/0187167 A1 | 10/2003 | Adams et al. |
| 2004/0110006 A1 | 6/2004 | Ishizaki et al. |
| 2004/0242761 A1 | 12/2004 | Dairoku et al. |
| 2005/0176834 A1 | 8/2005 | Hintz et al. |
| 2005/0245684 A1 | 11/2005 | Daniel et al. |
| 2005/0256469 A1 | 11/2005 | Qin et al. |
| 2006/0073969 A1 | 4/2006 | Torii et al. |
| 2006/0183828 A1 | 8/2006 | Dairoku et al. |
| 2006/0204755 A1 | 9/2006 | Torii et al. |
| 2007/0015860 A1 | 1/2007 | Frank et al. |
| 2007/0149691 A1 | 6/2007 | Ishizaki et al. |
| 2007/0225160 A1 | 9/2007 | Kitano et al. |
| 2007/0293617 A1 | 12/2007 | Riegel et al. |
| 2008/0125533 A1 | 5/2008 | Riegel et al. |
| 2008/0287631 A1 | 11/2008 | Nitschke |
| 2009/0194462 A1 | 8/2009 | Stueven et al. |
| 2010/0041550 A1 | 2/2010 | Riegel et al. |
| 2010/0062252 A1 | 3/2010 | Kimura et al. |
| 2010/0268181 A1 | 10/2010 | Ziemer et al. |
| 2011/0006140 A1 | 1/2011 | Ishizaki et al. |
| 2011/0042612 A1 | 2/2011 | Riegel et al. |

FOREIGN PATENT DOCUMENTS

| | | |
|---|---|---|
| EP | 0450922 | 7/1999 |
| EP | 0595803 | 2/2002 |
| EP | 1521601 | 5/2008 |
| JP | 4-041532 | 2/1992 |
| JP | 2002-527547 | 8/2002 |
| JP | 2002-528582 | 9/2002 |
| JP | 2004-352776 | 12/2004 |
| JP | 2006-299234 | 11/2006 |
| JP | 2008-106218 | 5/2008 |
| JP | 2008-142714 | 6/2008 |
| JP | 11-292919 | 8/2008 |
| JP | 2002-537410 | 11/2009 |

(Continued)

*Primary Examiner* — Terressa Boykin
(74) *Attorney, Agent, or Firm* — Occhiuti Rohlicek & Tsao LLP

(57) ABSTRACT

The present invention provides a method for producing a water-absorbing resin powder. The method includes a polymerization step, a drying step, a pulverization step, a classification step, and a surface cross-linking step. It further includes an additional step, performed before the surface cross-linking step, in which at least part of the classified polymer is supplied again to the same or a different pulverization step. The circulation pulverization ratio in the pulverization step is higher than 1.50.

22 Claims, 14 Drawing Sheets

(56) References Cited

FOREIGN PATENT DOCUMENTS

| | | |
|---|---|---|
| JP | 2009-256687 | 11/2009 |
| JP | 2004-197087 | 3/2011 |
| WO | 94/22502 | 10/1994 |
| WO | 95/02002 | 1/1995 |
| WO | 97/17397 | 5/1997 |
| WO | 00/52087 | 9/2000 |
| WO | 2005/012406 | 2/2005 |
| WO | 2005/063313 | 7/2005 |
| WO | 2006/082188 | 8/2006 |
| WO | 2006/082189 | 8/2006 |
| WO | 2006/082197 | 8/2006 |
| WO | 2008/025652 | 3/2008 |
| WO | 2008/025655 | 3/2008 |
| WO | 2008/025656 | 3/2008 |
| WO | 2008/037673 | 4/2008 |
| WO | 2008/092842 | 8/2008 |
| WO | 2008/092843 | 8/2008 |
| WO | 2009/062902 | 5/2009 |
| WO | 2009/113673 | 9/2009 |

* cited by examiner

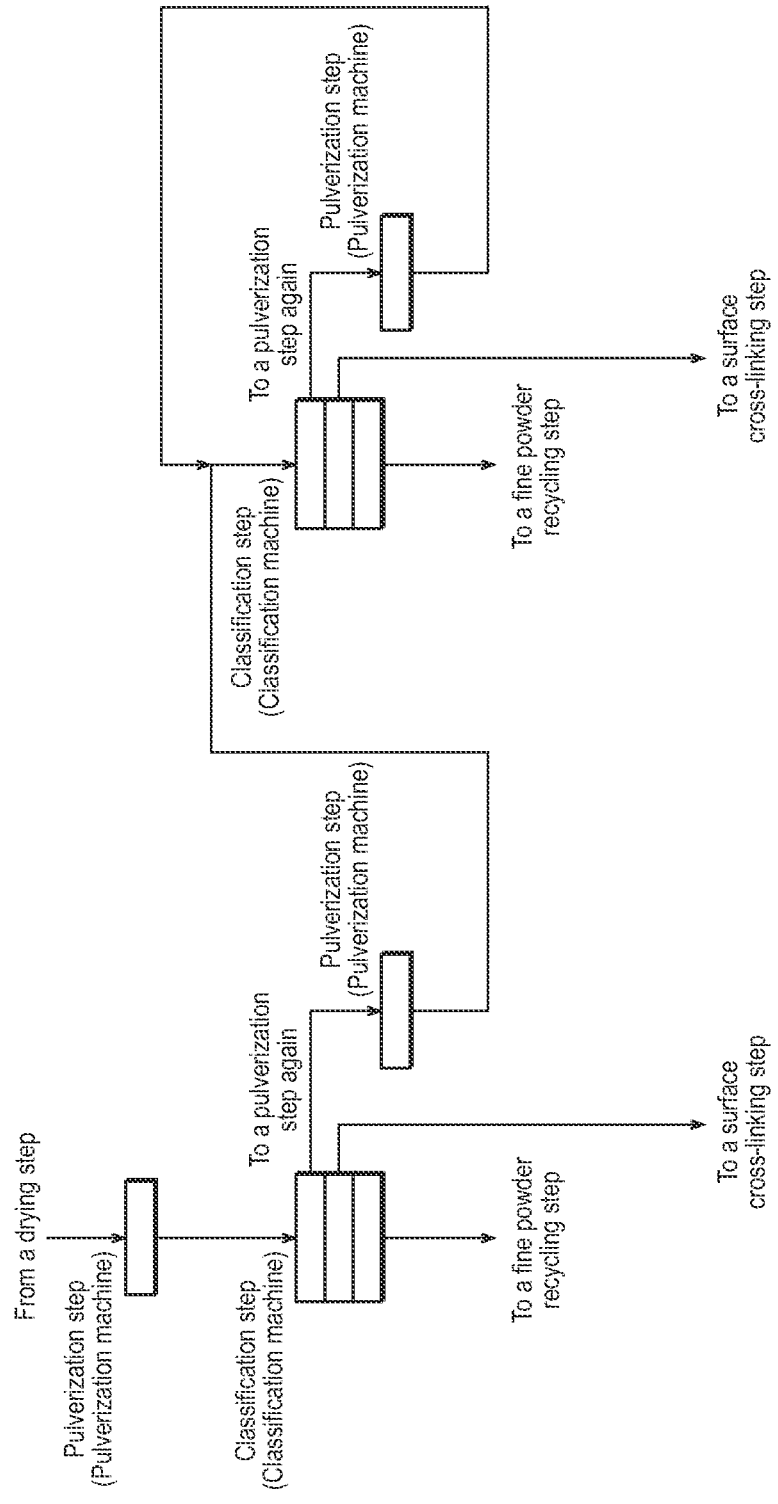

PRODUCTION METHOD FOR WATER-ABSORBING RESIN POWDER

CROSS REFERENCE TO RELATED APPLICATIONS

This application is a National Stage of International Application No. PCT/JP2010/066081, filed on Sep. 16, 2010, which claims priority to Japanese Application No. 2009-214820 filed Sep. 16, 2009, and Japanese Application No. 2009-214960 filed Sep. 16, 2009. The content of the prior applications are incorporated herein by reference in their entirety.

BACKGROUND OF THE INVENTION

1. Technical Field

The present invention relates to a production method for water-absorbing resin powder, and in more detail, the present invention relates to a production method for obtaining water-absorbing resin powder having high liquid permeability under highly pressurized condition, by performing surface cross-linking.

2. Background Art

The water-absorbing resin (Super Absorbent Polymer; SAP) is a water-swelling and water-insoluble polymer gelling agent, and is widely used mainly in disposable applications as absorbent articles such as disposable diapers, sanitary napkins; water-retention agent for agriculture and gardening; water-stops for industrial use; and the like. As a raw material of such a water-absorbing resin, many monomers or hydrophilic polymers have been proposed. In particular, a polyacrylic acid (salt)-type water-absorbing resin using acrylic acid and/or a salt thereof as a monomer, is produced most industrially from the viewpoint of high water absorbing performance thereof.

Such a water-absorbing resin is produced via a polymerization step, a drying step, (a removing step of a non-dried substance, as needed), a pulverization step, a classification step, a surface cross-linking step and the like (PATENT LITERATURES 1 to 5). With shift to higher performance of disposable diapers, which are main applications, many functions have been required also for the water-absorbing resin. Specifically, not only simple high absorption capacity but also many properties have been required for the water-absorbing resin, such as gel strength, water-soluble amount, water-absorbing speed, absorbency against pressure, liquid permeability, particle size distribution, urine resistance, antibacterial, impact resistance, powder fluidity, deodorant, coloring resistance, and low powder dust. Therefore, many proposals have been made, such as many surface cross-linking technologies, additives, and changes of production steps, in literatures other than the above or the following PATENT LITERATURES 1 to 49.

Among the above properties, in recent years, liquid permeability has been seen as a more important factor with increase in use amount (for example, 50% by weight or more) of the water-absorbing resin in the disposable diapers. And, many improvement methods or modified technologies of liquid permeability under load or liquid permeability without load have been proposed, such as SFC (Saline Flow Conductivity/PATENT LITERATURE 6) or GBP (Gel Bed Permeability/PATENT LITERATURES 7 to 9).

In addition, in such properties described in the above, many combinations of a plurality of parameters including liquid permeability have also been proposed, and there have been known technology for specifying impact resistance (FI) (PATENT LITERATURE 10), technology for specifying water-absorbing speed (FSR/Vortex) and the like (PATENT LITERATURE 11), and technology for specifying a product of liquid diffusion performance (SFC) and core absorbing amount after 60 minutes (DA60) (PATENT LITERATURE 12).

Further, as a method for enhancing liquid permeability such as SFC or GBP, there have been known technology for adding gypsum before polymerization or during polymerization (PATENT LITERATURE 13), technology for adding a spacer (PATENT LITERATURE 14), technology for using 5 to 17 mole/kg of a nitrogen-containing polymer having a nitrogen atom capable of protonation (PATENT LITERATURE 15), technology for using polyamine and a polyvalent metal ion or a polyvalent anion (PATENT LITERATURE 16), technology for coating the water-absorbing resin having a pH below 6 with polyamine (PATENT LITERATURE 17), and technology for using poly ammonium carbonate (PATENT LITERATURE 18). Other than these, there have also been known technology for using polyamine in a soluble amount of 3% or more, and technology for specifying wicking index (WI) or gel strength (PATENT LITERATURES 19 to 21). In addition, there has also been known technology for using a polyvalent metal salt, as well as controlling a methoxy phenol, which is a polymerization inhibitor in polymerization, to improve coloring and liquid permeability (PATENT LITERATURES 22 and 23). Still more, technology for controlling a bulk specific gravity at a high level by grinding the particles (PATENT LITERATURE 24) has also been known.

In addition, in addition to liquid permeability, water-absorbing speed is also an important fundamental property of the water-absorbing resin, and as a method for enhancing such water-absorbing speed, technology for enhancing water-absorbing speed by enhancing specific surface area has been known. Specifically, there have been proposed technology for controlling a particle diameter finely (PATENT LITERATURE 25), technology for granulating fine particles with large surface area (PATENT LITERATURES 26 to 28), technology for making a porous substance by freeze drying hydrogel (PATENT LITERATURE 29), technology for surface cross-linking of particles at the same time as granulation (PATENT LITERATURES 30 to 32), technology for performing foaming polymerization (PATENT LITERATURES 33 to 48), and technology for foaming and cross-linking after polymerization (PATENT LITERATURE 49) and the like.

In the above foaming polymerization, as a foaming agent to be used in a monomer, specifically there have been known technology for using a carbonate salt (PATENT LITERATURES 33 to 40), technology for using an organic solvent (PATENT LITERATURES 41, and 42), technology for using an inert gas (PATENT LITERATURES 43 to 45), technology for using an azo compound (PATENT LITERATURES 46 and 47), and technology for using an insoluble inorganic powder (PATENT LITERATURES 48) and the like.

PRIOR ART LITERATURES

Patent Literatures

PATENT LITERATURE 1: U.S. Pat. No. 6,576,713 specification

PATENT LITERATURE 2: U.S. Pat. No. 6,817,557 specification

PATENT LITERATURE 3: U.S. Pat. No. 6,291,636 specification

PATENT LITERATURE 4: U.S. Pat. No. 6,641,064 specification

PATENT LITERATURE 5: US-A-2008/0287631 specification
PATENT LITERATURE 6: U.S. Pat. No. 5,562,646 specification
PATENT LITERATURE 7: US-A-2005/0256469 specification
PATENT LITERATURE 8: U.S. Pat. No. 7,169,843 specification
PATENT LITERATURE 9: U.S. Pat. No. 7,173,086 specification
PATENT LITERATURE 10: U.S. Pat. No. 6,414,214 specification
PATENT LITERATURE 11: U.S. Pat. No. 6,849,665 specification
PATENT LITERATURE 12: US-A-2008/125533 specification
PATENT LITERATURE 13: US-A-2007/293617 specification
PATENT LITERATURE 14: US-A-2002/0128618 specification
PATENT LITERATURE 15: US-A-2005/0245684 specification
PATENT LITERATURE 16: WO 2006/082197 pamphlet
PATENT LITERATURE 17: WO 2006/082188 pamphlet
PATENT LITERATURE 18: WO 2006/082189 pamphlet
PATENT LITERATURE 19: WO 2008/025652 pamphlet
PATENT LITERATURE 20: WO 2008/025656 pamphlet
PATENT LITERATURE 21: WO 2008/025655 pamphlet
PATENT LITERATURE 22: WO 2008/092843 pamphlet
PATENT LITERATURE 23: WO 2008/092842 pamphlet
PATENT LITERATURE 24: U.S. Pat. No. 6,562,879 specification
PATENT LITERATURE 25: U.S. Pat. No. 5,505,718 specification
PATENT LITERATURE 26: US-A-2007/015860 specification
PATENT LITERATURE 27: WO 2005/012406 pamphlet
PATENT LITERATURE 28: U.S. Pat. No. 5,002,986 specification
PATENT LITERATURE 29: U.S. Pat. No. 6,939,914 specification
PATENT LITERATURE 30: U.S. Pat. No. 5,124,188 specification
PATENT LITERATURE 31: EP No. 0595803 specification
PATENT LITERATURE 32: EP No. 0450922 specification
PATENT LITERATURE 33: U.S. Pat. No. 5,118,719 specification
PATENT LITERATURE 34: U.S. Pat. No. 5,154,713 specification
PATENT LITERATURE 35: U.S. Pat. No. 5,314,420 specification
PATENT LITERATURE 36: U.S. Pat. No. 5,399,591 specification
PATENT LITERATURE 37: U.S. Pat. No. 5,451,613 specification
PATENT LITERATURE 38: U.S. Pat. No. 5,462,972 specification
PATENT LITERATURE 39: WO 95/02002 pamphlet
PATENT LITERATURE 40: WO 2005/063313 pamphlet
PATENT LITERATURE 41: WO 94/022502 pamphlet
PATENT LITERATURE 42: U.S. Pat. No. 4,703,067 specification
PATENT LITERATURE 43: WO 97/017397 pamphlet
PATENT LITERATURE 44: WO 00/052087 pamphlet
PATENT LITERATURE 45: U.S. Pat. No. 6,107,358 specification
PATENT LITERATURE 46: U.S. Pat. No. 5,856,370 specification
PATENT LITERATURE 47: U.S. Pat. No. 5,985,944 specification
PATENT LITERATURE 48: WO 2009/062902 pamphlet
PATENT LITERATURE 49: EP No. 1521601 specification

SUMMARY OF THE INVENTION

Problem to be Solved by the Invention

As described above, to enhance properties of the water-absorbing resin, proposals have been made, such as many surface cross-linking technologies, additives, and changes of production steps. Among them, liquid permeability (PATENT LITERATURES 6 to 24) or water-absorbing speed (PATENT LITERATURES 25 to 49) is important as a fundamental properties of the water-absorbing resin, and many improvement technologies have been proposed.

However, the change or the addition of raw materials of the water-absorbing resin, such as a surface cross-linking agent or an additive (polyamine polymer, inorganic fine particles, thermoplastic polymers) or the like, resulted in not only decrease in safety of raw materials or cost-up but also decrease in other properties, in some cases. In addition, the addition of a new production step not only causes cost-up due to expensive facility investment or energy thereof but also requires an industrially complicated operation, and rather causes decrease in productivity or properties in some cases.

In addition, the above method showed a certain degree of effect in a small scale such as in an experiment room, however, showed in some cases not sufficient effect in a large scale in a practical plant (for example, in a production amount of 1 [t/hr] or more).

Accordingly, to improve the above problem, it is an object of the present invention to provide a method for enhancing and stabilizing properties (for example, liquid permeability or damage resistance) of a water-absorbing resin, by a simple and convenient method without requiring change of raw materials or expensive facility investment, in a large scale production.

Means for Solving the Problem

To solve the above-described problem, the present inventors have focused attention on a pulverization step of the water-absorbing resin, which has conventionally been never paid any attention as an improvement method for the above liquid permeability or water-absorbing speed, and found, that liquid permeability or damage resistance of the water-absorbing resin can be enhanced (even when compared at the same particle size), by circulating predetermined amount or more, and have thus completed the present invention.

That is, the method for producing the water-absorbing resin according to one aspect of the present invention is:

a method for producing water-absorbing resin powder, sequentially comprising:

a polymerization step for polymerizing an aqueous solution of acrylic acid (salt) to obtain a hydrogel-like cross-linked polymer;

a drying step for drying the obtained hydrogel-like cross-linked polymer to obtain a dried polymer;

a pulverization step for pulverizing the obtained dried polymer with a pulverizing means to obtain a pulverized polymer;

a classification step for classifying the obtained pulverized polymer to obtain a classified polymer; and a surface cross-linking step for surface cross-linking the obtained classified polymer. And, at least a part of the classified polymer is supplied again to the same or different pulverization step, before the surface cross-linking step. In addition, it is also characterized in that, in this case, circulation pulverization ratio in the pulverization step, represented by the following equation:

(Circulation pulverization ratio)=(total supply amount of the water-absorbing resin to the pulverization step)/(total discharge amount of the water-absorbing resin at the drying step)   [EXPRESSION 1]

is larger than 1.50, wherein (total supply amount of the water-absorbing resin to the pulverization step)=(total discharge amount of the water-absorbing resin at the drying step)+(amount of the classified polymer supplied again to the same or different pulverization step).

Advantageous Effect of the Invention

The present invention is capable of enhancing and stabilizing liquid permeability or damage resistance of the water-absorbing resin, by a simple and convenient method of controlling a circulation pulverization ratio at the pulverization step before the surface cross-linking step, without requiring change of raw materials or expensive facility investment.

BRIEF DESCRIPTION OF DRAWINGS

FIG. 7 is a conceptual diagram, where the third classification step was omitted, in the conceptual diagram of FIG. 4, and a schematic drawing showing a flow, where circulation is performed to the second classification step (of FIG. 4) (the second classification step in FIG. 7), after the second pulverization step.

MODE FOR CARRYING OUT THE INVENTION

Figure 1:
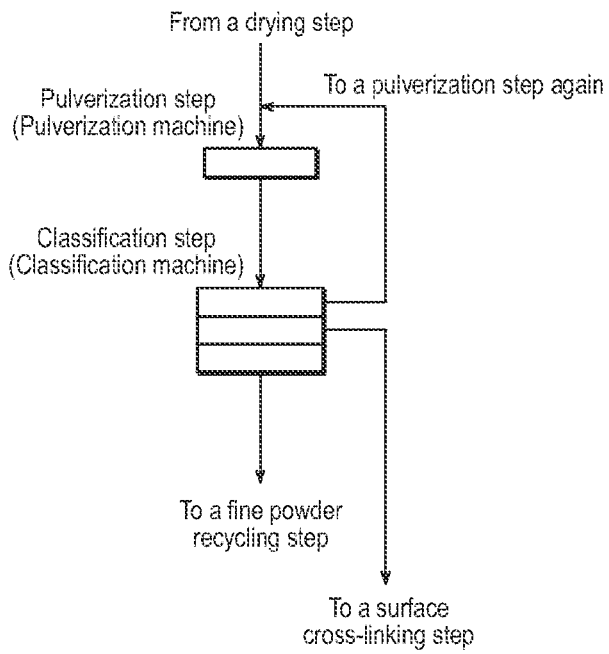
FIG. 1 is a schematic drawing showing a flow of supplying again a pulverized polymer to the same pulverization step after classification. It is a schematic drawing showing the flow where a classification step is set after the pulverization step for a dried substance (the whole amount), for classifying to "objective particle size (for example, 850 to 150 μm)"/a non-passed through substance/fine powder, at said classification step, and circulating only the non-passed through substance to the pulverization step. It should be noted that, although not shown in Figures, the dried substance may be crushed as needed before the pulverization step.

Explanation will be given below in detail on the production method for the water-absorbing resin according to the present invention, however, as for other than the following exemplification, the scope of the present invention should not be limited to these explanations, and may also be changed and performed as appropriate within a scope not to impair gist of the present invention. Specifically, the present invention should not be limited to the following each embodiment, and various changes within a scope shown in claims may be allowed, and also embodiments obtained by combining as appropriate technical means disclosed each in different embodiments are included in a technical scope of the present invention.

[1] Definition of Terminology (a) "Water-Absorbing Resin"

In the present description, the "water-absorbing resin" means a water swelling and water insoluble "polymer gelling agent", having the following properties. That is, as water swelling properties, it is the one having absorption capacity without load (CRC) of equal to or higher than 5 g/g. CRC is preferably 10 to 100 g/g, and further preferably 20 to 80 g/g. In addition, as water insoluble properties, water-soluble amount (Extractables) is essentially 0 to 50% by weight. The water-soluble amount is preferably 0 to 30% by weight, further preferably 0 to 20% by weight, and particularly preferably 0 to 10% by weight.

It should be noted that the "water-absorbing resin" is not limited to a polymer form as a whole (100% by weight), and may include additives (to be described later), in a range to maintain the above performances. That is, even a water-absorbing resin composition containing the water-absorbing resin and the additives, it is generally called "water-absorbing resin" in the present invention. In the case where the water-absorbing resin is a water-absorbing resin composition, content of the water-absorbing resin (polyacrylic acid (salt)-based water-absorbing resin) is preferably 70 to 99.9% by weight, more preferably 80 to 99.7% by weight, and still more preferably 90 to 99.5% by weight, relative to total amount of the composition. As the components other than the water-absorbing resin, from the viewpoint of water-absorbing speed or impact resistance of powder (particles), water is preferable, and additives to be described later may be contained, as needed.

(b) "Polyacrylic Acid (Salt)"

In the present description, the "polyacrylic acid (salt)" means a polymer containing an arbitrary graft component and acrylic acid (salt) as a principal component, as a repeating unit. Specifically, it means a polymer containing acrylic acid (salt), as the monomer excluding a cross-linking agent, essentially 50 to 100% by mole, preferably 70 to 100% by mole, further preferably 90 to 100% by mole, particularly preferably substantially 100% by mole. The salt as the polymer essentially contains a water-soluble salt, preferably contains a monovalent salt, more preferably contains an alkali metal salt or an ammonium salt, still more preferably contains an alkali metal salt, and particularly preferably contains a sodium salt. It should be noted that shape of polyacrylic acid (salt) is not especially limited, however, a particle or a powder is preferable.

(c) "EDANA" and "ERT"

"EDANA" is an abbreviation of European Disposables and Nonwovens Associations. In addition, "ERT" is an abbreviation of the measurement method (ERT/EDANA Recommended Test Method) for the water-absorbing resin of the European standard (it is nearly a world standard). In the present description, properties of the water-absorbing resin is measured with reference to the ERT original (known literature: revised in 2002), unless otherwise specified.

(c-1) "CRC" (ERT441.2-02)

"CRC" is an abbreviation of Centrifuge Retention Capacity, meaning absorption capacity without load (hereafter it may also be referred simply to "absorption capacity"). Specifically, it is specified as absorption capacity (unit; g/g) after free swelling 0.200 g of the water-absorbing resin in non-woven fabric in 0.9% by weight of saline solution for 30 minutes, and then water rinsing by a centrifugal separation machine (under 250 G).

(c-2) "AAP" (ERT442.2-02)

"AAP" is an abbreviation of Absorbency Against Pressure, meaning absorption capacity with load. Specifically, it is specified as absorption capacity (unit; g/g) after swelling 0.900 g of the water-absorbing resin in 0.9% by weight of saline solution, under a load of 1.9 kPa for 1 hour. It should be noted that in the present invention and Examples, AAP was measured under a load of 4.8 kPa.

(c-3) "Extractables" (ERT470.2-02)

"Extractables" means amount of water-soluble components (soluble components). Specifically, it is a value (unit; % by weight) measured as a dissolved polymer amount by pH titration, after adding 1.000 g of the water-absorbing resin in 200 ml of 0.9% by weight of saline solution and stirring for 16 hours.

(c-4) "PSD" (ERT420.2-02)

"PSD" is abbreviation of Particle Size Distribution, meaning particle size distribution measured by sieve classification. It should be noted that weight average particle diameter and particle diameter distribution width are measured by a similar method to "(1) Average Particle Diameter and Distribution of Particle Diameter" described in EP No. 0349240 specification (page 7, lines 25 to 43) or WO 2004/069915.

(c-5) Others pH (ERT400.2-02): It means pH of the water-absorbing resin.

Moisture Content (ERT430.2-2): It means water content of the water-absorbing resin:

Flow Rate (ERT450.2-02): It means flowing speed of the water-absorbing resin powder.

Density (ERT460.2-02): It means density of the water-absorbing resin.

(d) "Water-Absorbing Agent"

In the present description, the "water-absorbing agent" means a gelling agent of aqueous liquid, composed of the water-absorbing resin as the main component. It should be noted that said aqueous liquid may not only be water but also urine, blood, excrement, waste liquid, moisture or steam, ice, a mixture of water and an organic solvent and/or an inorganic solvent, rain water, underground water or the like, and is not especially limited, as long as it contains water. Among these, urine, in particular, human urine is preferable. Content of the water-absorbing resin (a polyacrylic acid (salt)-based water-absorbing resin) according to the present invention is preferably 70 to 99.9% by weight, more preferably 80 to 99.7% by weight, and still more preferably 90 to 99.5% by weight, relative to total weight of the water-absorbing agent. As components other than the water-absorbing resin, from the viewpoint of water-absorbing speed or impact resistance of powder (particles), water is preferable, and additives to be described later are contained as needed.

(e) "Others"

In the present description, "X to Y" showing a range means "equal to or larger than X to equal to or smaller than Y". In addition, "ton" as a unit of weight means "metric ton". Still more, unless otherwise specified, "ppm" means "ppm by weight" or "ppm by mass".

Still more, measurement of properties of the water-absorbing resin is performed, unless otherwise specified, under conditions of a temperature of 20 to 25° C. (it may also be referred to simply as "room temperature", or "normal temperature"), and a relative humidity of 40 to 50%.

[2] Production Method for the Water-Absorbing Resin (1) Polymerization Step

The present step is a step for polymerizing an aqueous solution of acrylic acid (salt) to obtain a hydrogel-like cross-linked polymer.

(a) Monomer (Excluding a Cross-Linking Agent)

The water-absorbing resin according to the present invention uses an aqueous solution of acrylic acid (salt), as a raw material (monomer) thereof. Said aqueous solution contains acrylic acid and/or a salt thereof as a main component. In addition, it is preferable that the hydrogel-like cross-linked polymer (hereafter may be referred to also as "hydrogel") obtained by polymerization is neutralized in at least part of the acid groups of the polymer, from the viewpoint of water-absorbing characteristics or amount of a residual monomer. Such a partially-neutralized salt of acrylic acid is not especially limited, however, from the viewpoint of water-absorbing performance of the water-absorbing resin, it is preferably a monovalent salt of acrylic acid selected from an alkali metal salt, an ammonium salt, and an amine salt of acrylic acid, more preferably an alkali metal salt of acrylic acid, furthermore preferably an acrylate salt selected from a sodium salt, a lithium salt, a potassium salt, and particularly preferably a sodium salt.

Therefore, a basic substance to be used in neutralization of acrylic acid as a monomer or a polymer (hydrogel) after polymerization, is not especially limited, however, it is preferably an alkali metal hydroxide such as sodium hydroxide, potassium hydroxide, lithium hydroxide, or a monovalent basic substance of a (hydrogen) carbonate such as sodium (hydrogen) carbonate, potassium (hydrogen) carbonate, and particularly preferably sodium hydroxide.

The above neutralization may be performed on a polymer (hydrogel) after polymerization, or polymerization may be performed using a salt form of acrylic acid as a monomer, however, from the viewpoint of enhancement of productivity or AAP (absorbency against pressure) or the like, it is preferable to use a neutralized monomer, that is, to use a partially neutralized salt of acrylic acid, as a monomer.

Neutralization ratio of the above neutralization is not especially limited, however, it is preferably 10 to 100% by mole, more preferably 30 to 95% by mole, still more preferably 50 to 90% by mole, and particularly preferably 60 to 80% by mole. In addition, temperature in neutralization (neutralization temperature) is not especially limited, however, it is determined as appropriate at preferably 10 to 100° C., and still more preferably 30 to 90° C. Other preferable conditions and the like of neutralization treatment have been exemplified in the description of EP No. 574260 specification, and conditions described in said publication may be applied also to the present invention.

The above monomer (including the following cross-linking agent) is polymerized usually in a form of an aqueous solution, and solid content concentration thereof is usually 10 to 90% by weight, preferably 20 to 80% by weight, still more preferably 30 to 70% by weight, and particularly preferably 35 to 60% by weight. It should be noted that polymerization may be performed in slurry (water dispersion liquid) over saturation concentration, however, from the viewpoint of properties, it is preferably performed in an aqueous solution with saturation concentration or lower.

Further, to improve various properties of the obtained water-absorbing resin, starch, polyacrylic acid (salt), a water-soluble resin such as polyethyleneimine or a water-absorbing resin, or various foaming agents (a carbonate salt, an azo compound, air bubbles and the like), a surfactant, or additives to be described later may be added to an aqueous solution of acrylic acid (salt) or hydrogel after polymerization, a dried substance or a powdery substance, as an arbitrary component. As the addition amount thereof, amount of the water-soluble resin or the water-absorbing resin is preferably 0 to 50% by weight, more preferably 0 to 20% by weight, particularly preferably 0 to 10% by weight, and most preferably 0 to 3% by weight, relative to 100% by weight of the monomer. In addition, the above foaming agent, surfactant or additives is preferably 0 to 5% by weight, and more preferably 0 to 1% weight, relative to 100% by weight of the monomer.

In addition, in the case of using a chelating agent, a hydroxy carboxylic acid or a reductive inorganic salt, used amount thereof is preferably 10 to 5000 ppm by weight, more preferably 10 to 1000 ppm by weight, still more preferably 50 to 1000 ppm by weight, particularly preferably 100 to 1000 ppm by weight, relative to total amount of 100% by weight of the obtained water-absorbing resin. Among these, use of the chelating agent is preferable. By using the chelating agent, enhancement of color stability (color stability in the case of long period of storing under high temperature and high humidity condition), or urine resistance (prevention of gelling deterioration) of the water-absorbing resin can be attained. As the above chelating agent, those exemplified in U.S. Pat. No. 6,599,989 specification or WO 2008/090961 pamphlet or the like are applicable, and among them, an aminocarboxylic acid-based metal chelating agent or a polyvalent phosphoric acid-based compound is preferable. It should be noted that a graft polymer (for example, a starch-acrylic acid graft polymer) or a water-absorbing resin composition obtained by using other component is also generally called a polyacrylic acid (salt)-based water-absorbing resin, in the present invention.

In addition, in the present invention, in the case where acrylic acid (salt) is used as a main component, a hydrophilic or hydrophobic unsaturated monomer (hereafter may also be referred to as "other monomers") other than acrylic acid (salt), may be contained. These other monomers are not especially limited, however, they include, for example, methacrylic acid, (maleic anhydride) maleic acid, 2-(meth)acrylamido-2-methylpropane sulfonic acid, (meth)acryloxyalkane sulfonic acid, N-vinyl-2-pyrrolidone, N-vinylacetamide, (meth) acrylamide, N-isopropyl (meth)acrylamide, N,N-dimethyl (meth)acrylamide, 2-hydroxyethyl (meth)acrylate, methoxy polyethylene glycol (meth)acrylate, polyethylene glycol (meth)acrylate, stearyl acrylate or a salt thereof. In the case where such other monomers are used, used amount thereof is not especially limited, as long as it is in a degree not to impair desired characteristics, however, it is preferably 50% by weight or lower, and more preferably 0 to 20% by weight, relative to 100% by weight of the total monomer.

(b) Cross-Linking Agent (Internal Cross-Linking Agent)

In the present invention, it is particularly preferable that a cross-linking agent (it may also be referred to as "an internal cross-linking agent") is used, from the viewpoint of water-absorbing characteristics. Used amount of the internal cross-linking agent is preferably 0.001 to 5% by mole, more preferably 0.005 to 2% by mole, still more preferably 0.01 to 1% by mole, and particularly preferably 0.03 to 0.5% by mole, relative to 100% by mole of the above monomer excluding the cross-linking agent, from the viewpoint of properties.

The internal cross-linking agent which can be used is not especially limited, and it can be exemplified, for example, a polymerizable cross-linking agent with acrylic acid; a reactive cross-linking agent with a carboxylic group; or a cross-linking agent having both thereof. Specifically, as the polymerizable cross-linking agent, a compound having at least two polymerizable double bonds in a molecule can be exemplified such as N,N'-methylenebisacrylamide, (poly)ethylene glycol di(meth)acrylate, (polyoxyethylene) trimethylolpropane tri(meth)acrylate, poly(meth)allyoxy alkane, or the like. In addition, as the reactive cross-linking agent, a covalent bonded-type cross-linking agent, such as polyglycidyl ether (ethylene glycol diglycidyl ether or the like), polyol (propane diol, glycerin, sorbitol or the like), and an ion-bonded cross-linking agent, which is a compound of a polyvalent metal, such as aluminum, are exemplified. Among these, from the viewpoint of water-absorbing characteristics, the above polymerizable cross-linking agent with acrylic acid is preferable, and in particular, an acrylate-type, allyl-type or acrylamide-type polymerizable cross-linking agent is used preferably. These internal cross-linking agents may be used alone or may be used in combination of two or more kinds.

(c) Polymerization Initiator

A polymerization initiator to be used in the present invention may be selected as appropriate depending on polymerization mode. As such a polymerization initiator, for example, a photodecomposition-type polymerization initiator, a thermal decomposition-type polymerization initiator, and a redox-type polymerization initiator or the like are exemplified. Used amount of the polymerization initiator is preferably 0.0001 to 1% by mole, and more preferably 0.001 to 0.5% by mole, relative to 100% by mole of the monomer.

As the photodecomposition-type polymerization initiator, for example, a benzoin derivative, a benzyl derivative, an acetophenone derivative, a benzophenone derivative, and an azo compound or the like are exemplified. In addition, as the thermal decomposition-type polymerization initiator, for example, a persulfate salt (sodium persulfate, potassium persulfate, ammonium persulfate), a peroxide (hydrogen peroxide, t-butyl peroxide, methyl ethyl ketone peroxide), and an azo compound (2,2'-azobis(2-amidinopropane) dihydrochloride, 2,2'-azobis[2-(2-imidazolin-2-yl)propane]dihydrochloride or the like) or the like are exemplified. In addition, among these radical polymerization initiators, the persulfate salt, the peroxide, and the azo compound may also be used as a photopolymerization initiator.

As the redox-type polymerization initiator, for example, a combined system of the above persulfate salt or the peroxide with a reducing compound such as L-ascorbic acid or sodium hydrogen sulfite, may be exemplified. In addition, combined use of the above photodecomposition-type initiator and the above thermal decomposition-type polymerization initiator is also included as a preferable embodiment.

(d) Polymerization Method

As the polymerization method according to embodiments of the present invention, spray polymerization or droplet polymerization may be allowed from the viewpoint of performance of the water-absorbing resin, such as liquid permeability or water-absorbing speed, or easiness of control of polymerization, however, preferably, aqueous solution polymerization or reverse phase suspension polymerization is usually performed. Among these polymerization methods, aqueous solution polymerization, which has conventionally been difficult in control of polymerization or improvement of coloring, is preferable, continuous aqueous solution polymerization is more preferable, and continuous aqueous solution polymerization performed at high concentration and at a high initiation temperature, is particularly preferable. Still more, suitable control is possible in continuous polymerization and continuous production (the drying step to the surface cross-linking step) for producing the water-absorbing resin by a large scale, such as 0.5 t/hr or more, more preferably 1 t/hr or more, still more preferably 5 t/hr or more, and particularly preferably 10 t/hr or more, by polymerization of a monomer aqueous solution in one line.

As a preferable mode of the continuous aqueous solution polymerization, for example, there are included continuous kneader polymerization (described in U.S. Pat. Nos. 6,987,151, 6,710,141 or the like), or continuous belt polymerization (described in U.S. Pat. Nos. 4,893,999, 6,241,928, US-A-2005/215734 or the like). In these continuous aqueous solution polymerization, the water-absorbing resin can be produced in high productivity, but there is observed tendency of variation of properties (increase in the standard deviation) with scale up, however, the present invention overcomes also such a problem.

According to the present invention, because the water-absorbing resin with superior stability of a monomer and high whiteness can be obtained, even in polymerization under such high concentration or high temperature, effect is exerted still more significantly under such condition. Such polymerization initiated at such high temperature has been exemplified in U.S. Pat. Nos. 6,906,159 and 7,091,253 or the like, however, according to the production method of the present invention, also stability of a monomer before polymerization is excellent, and thus production in an industrial scale is easy.

These polymerization can be performed even under air atmosphere, however, from the viewpoint of improvement of coloring, it is preferable to be performed under inert gas atmosphere such as nitrogen or argon (for example, under an oxygen concentration of 1% by volume or lower). In addition, it is preferable that a monomer or an aqueous solution containing the monomer is used in the polymerization after dissolved oxygen therein is sufficiently replaced with inert gas (for example, to an oxygen concentration below 1 [mg/L]). Even by such deaeration, stability of the monomer is excellent, gelling before polymerization seldom occurs, and the water-absorbing resin having higher properties and higher whiteness can be provided.

(2) Gel Crushing Step

The hydrogel-like cross-linked polymer (hydrogel) obtained in the above polymerization step may be supplied to a drying step (to be described later) as it is, however, from the viewpoint of water-absorbing speed or liquid permeability, it is crushed to become a particulate state, using a crushing machine (a kneader, a meat chopper, or the like), as needed, during the polymerization or after the polymerization. That is, weight average particle diameter (specified by sieving classification) of the particulate hydrogel after the above gel crushing is in a range of preferably 0.1 to 10 mm, more preferably 0.5 to 5 mm, and still more preferably 1 to 3 mm.

Temperature of the hydrogel in gel crushing, from the viewpoint of properties, is warmed or heated in a range of preferably 40 to 95° C., and more preferably 50 to 80° C. Solid content of the hydrogel is not especially limited, however, from the viewpoint of properties, it is preferably 20 to 80% by weight, more preferably 30 to 70% by weight, and still more preferably 40 to 60% by weight.

(3) Drying Step

In the drying step, the above hydrogel is dried to obtain a dried polymer. Resin solid content of the dried polymer determined from weight reduction in drying (1 g of powder or particles is heated at 180° C. for 3 hours) is adjusted in a range of preferably 80% by weight or more, more preferably 85 to 99% by weight, still more preferably 90 to 98% by weight, and particularly preferably 92 to 97% by weight.

Drying temperature is not especially limited, however, it may be set preferably within a range of 100 to 300° C., and more preferably within a range of 150 to 250° C. As the drying method, various methods can be adopted, such as heating drying, hot air drying, reduced pressure drying, infrared ray drying, microwave drying, rotating drum-type drying (for agitated-drying gel in the heated rotating drum), agitated-drying with a rotor, drum dryer drying, azeotropic dewatering with a hydrophobic organic solvent, high humidity drying using high temperature steam in hot air drying, and the like. Drying is performed in a continuous system or a rotation system (batch system in another name), and preferably it is performed by continuous-type drying. Preferably, it is hot air drying, in particular, hot air drying using vapor having a dew point of particularly 40 to 100° C., more preferably a dew point of 50 to 90° C. In the hot air drying, a through flow band-type drying machine is adopted, and other drying machine may be used in combination, as needed.

In the case of drying the above particulate hydrogel (having a weight average particle diameter of, for example, 0.1 to 10 mm), shape of the dried polymer is usually particulate or aggregate thereof (for example, a block-like substance; refer to PATENT LITERATURE 1), however, it is not especially limited. Size of particle of a dried substance is determined by the particle diameter of hydrogel before drying, and shrinkage ratio of the particle diameter before and after drying can be determined also by calculation from the water content. An aggregated substance obtained at the drying step may be supplied as it is to the pulverization step, however, it is crushed (an aggregated state is loosened) as needed at the exit of the drying machine to become a particulate again having a weight average particle diameter of 50 mm or smaller, 30 mm or smaller, 0.1 to 10 mm, preferably 0.5 to 5 mm, and still more preferably 1 to 3 mm, to be supplied to the next step, in particular, the pulverization step. It should be noted that, in the case of drying the particulate hydrogel, in particular, in the case of drying in a laminated state, and still more in through flow band-type drying, it is preferable to set a crushing step before the pulverization step or a transportation step to the pulverization step, because it becomes an aggregated substance, in particular, a block-like substance, composed of dried particles of the particulate hydrogel. For crushing, a low speed pin-type crushing machine is used as appropriate. In this description, the crushing step means an operation of loosening the dried aggregate substance, in particular, the block-like dried aggregate substance to about a size (weight average particle diameter) or more of the dried particle before aggregation, in the above range (preferably 50 mm or smaller, 0.5 to 5 mm, and still more about 1 to 3 mm), and in this case, even when apart of the dried substance is pulverized but has, as a whole, about a size (weight average particle diameter) or more of one dried particle (primary particle), it is called the crushing step, and is thus different concept from the pulverization step to be described later, that is, a pulverization (crushing) operation of the dried substance (particularly, the dried particle (primary particle) or the dried aggregated substance thereof) to objective particle size. Thus, the dried substance crushed as needed is a particulate dried substance or an aggregate thereof (preferably 50 mm or smaller), and is still more supplied to the pulverization step or the classification step via the transportation step (preferably a pneumatic transportation step) (reference: FIG. 4 to FIG. 11, which include the crushing step).

(4) Pulverization Step

The present invention is characterized that circulation amount in the pulverization step is set at a certain level or more to enhance liquid permeability or water-absorbing speed. Means for controlling the circulation amount in the pulverization step to certain level or more is attained by supplying again at least a part of the classified polymer to the same or different pulverization step.

That is, according to one aspect of the present invention, there is provided a method for producing water-absorbing resin powder, sequentially having: a polymerization step for polymerizing an aqueous solution of acrylic acid (salt) to obtain a hydrogel-like cross-linked polymer; a drying step for drying the obtained hydrogel-like cross-linked polymer to obtain a dried polymer; a pulverization step for pulverizing the obtained dried polymer with a pulverizing means to obtain a pulverized polymer; a classification step for classifying the obtained pulverized polymer to obtain a classified polymer; and a surface cross-linking step for surface cross-linking the obtained classified polymer, characterized in that, at least a part of the classified polymer is supplied again to the same or different pulverization step, before the surface cross-linking step, wherein circulation pulverization ratio in the pulverization step is larger than 1.50.

It should be noted that "pulverization" in the present invention is a step for grain refining particles or the aggregate substance thereof; the crushing step (loosening of the aggregate) of the aggregate performed at the exit of a band drying machine or the like is not included to the pulverization step; preferably a roll-type pulverization machine is used as the pulverization machine; and other pulverization machines (for example, a pin mill) and the like may be used for small amount as needed. It should be noted that, in pulverization mainly with the roll-type pulverization machine, in particular, in pulverization of an amount of 80% by weight or more, particularly 90% by weight or more, there is no practical problem in specifying circulation pulverization ratio of the present invention by circulation pulverization ratio at the pulverization step using the roll-type pulverization machine. In addition, as described in a patent literature (U.S. Pat. No. 6,562,879), grinding and pulverizing are different concepts.

(Circulation Pulverization Ratio)

In the present invention, "circulation pulverization ratio" is represented by the following equation:

(Circulation pulverization ratio)=(total supply amount of the water-absorbing resin to the pulverization step)/(total discharge amount of the water-absorbing resin at the drying step)     [EXPRESSION 2]

wherein (total supply amount of the water-absorbing resin to the pulverization step)=(total discharge amount of the water-absorbing resin at the drying step)+(amount of the classified polymer supplied again to the same or different pulverization step).

It is specified by pulverized amount using the same or different pulverization machine, and in continuous pulverization, it is specified by pulverized amount [kg/hr] in equilibrium. In the present description, there may be the case where effect of the present invention is small in a small scale, and the feature of circulation pulverization ratio in the present invention is suitably applicable to a range of the above large scale (1 [t/hr]) or more.

In the present description, the circulation pulverization ratio of 1.50 or lower provides inferior liquid permeability (for example, SFC) of the water-absorbent resin, and largely increases fine powder after damage, too, and thus it is not preferable. On the other hand, by controlling the circulation pulverization ratio at a value larger than 1.50, liquid permeability (for example, SFC) of the water-absorbent resin can be enhanced, while suppressing decrease in damage resistance thereof to the minimum.

It should be noted that increase in fine powder after damage is specified by the measurement method of the Examples, and even when the amount of fine powder (for example, passed through substance of the JIS standard sieve of 150 μm) is small just after the production of the water-absorbing resin, fine powder generates by process damage in producing the disposable diapers, which gives adverse influence such as decrease in liquid permeability, in practical use of the disposable diapers, therefore it is not preferable.

In the present invention, in view of the liquid permeability (for example, SFC), the lower limit of the circulation pulverization ratio is higher than 1.50, still more preferably in the order of 1.60 or higher, 1.70 or higher, 1.80 or higher, 1.90 or higher, 2.00 or higher, and 2.10 or higher. On the other hand, in view of the water-absorbing speed (for example, FSR), the upper limit of the circulation pulverization ratio is preferably in the order of 3.00 or lower, 2.50 or lower, 2.40 or lower, 2.30 or lower, 2.10 or lower, 1.90 or lower, 1.70 or lower, and 1.60 or lower.

That is, in view of balance between the water-absorbing speed and the liquid permeability, the circulation pulverization ratio is determined as appropriate within the above range, however, it is preferably over 1.50 and 3.00 or lower. Among these, to attain liquid permeability, it is controlled preferably at 1.70 to 2.80, and still more 1.90 to 2.70, and in particular, 2.10 to 2.50.

Conventionally, from the common general knowledge of pulverization, the non-passed through substance (which is left on the sieve) after classification has been decreased as much as possible, relative to objective particle size (for example, 850 to 150 μm, or a substance passed through 710 μm), and usually it has been set below 10% (circulation pulverization ratio specified by the present invention is below 1.10), still more preferably below 5% (the same is below 1.05), and particularly preferably below 1% (the same is below 1.01), however, in the present invention, by increasing the non-passed through substance after classification, as compared with objective particle size, before the surface cross-linking step of the water-absorbing resin, liquid permeability (SFC) of the water-absorbing resin can be enhanced, while suppressing the decrease in damage resistance after surface cross-linking (in particular, surface cross-linking with an organic surface cross-linking agent) at a high value.
(Control Method)

Figure 2:
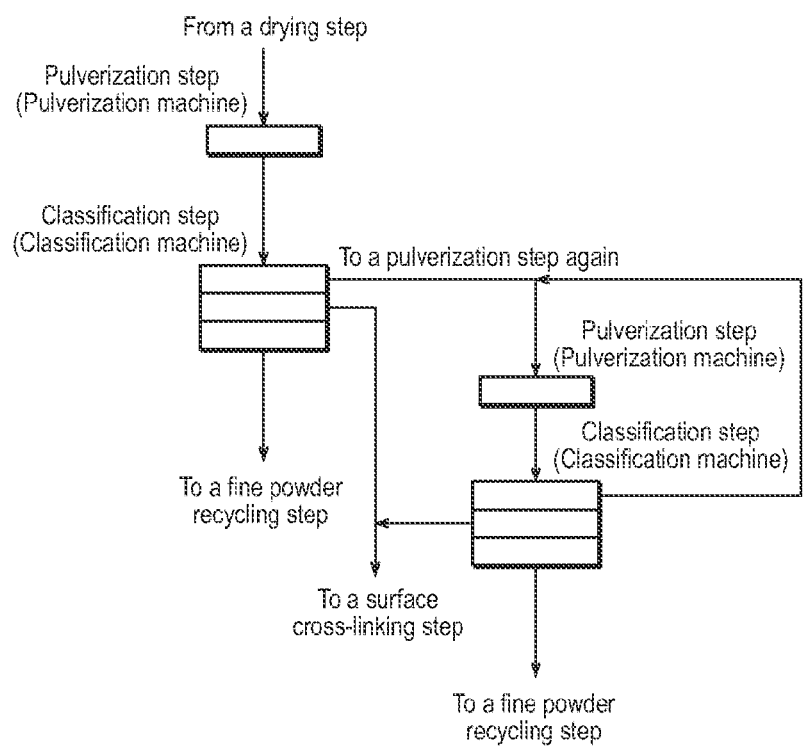
FIG. 2 is a schematic drawing showing a flow of supplying again a pulverized polymer to a different pulverization step (a second pulverization step) after classification. In the conceptual diagram of FIG. 1, after supplying only the non-passed through substance to a second pulverization step, it is classified again at the second pulverization step to "objective particle size (for example, 850 to 150 μm)"/a non-passed through substance/fine powder; only the non-passed through substance is supplied to the pulverization step (the second pulverization step); and the non-passed through substance at the second classification step is supplied as needed to re-pulverization (for example, the first pulverization step or the second pulverization step).
Figure 3:
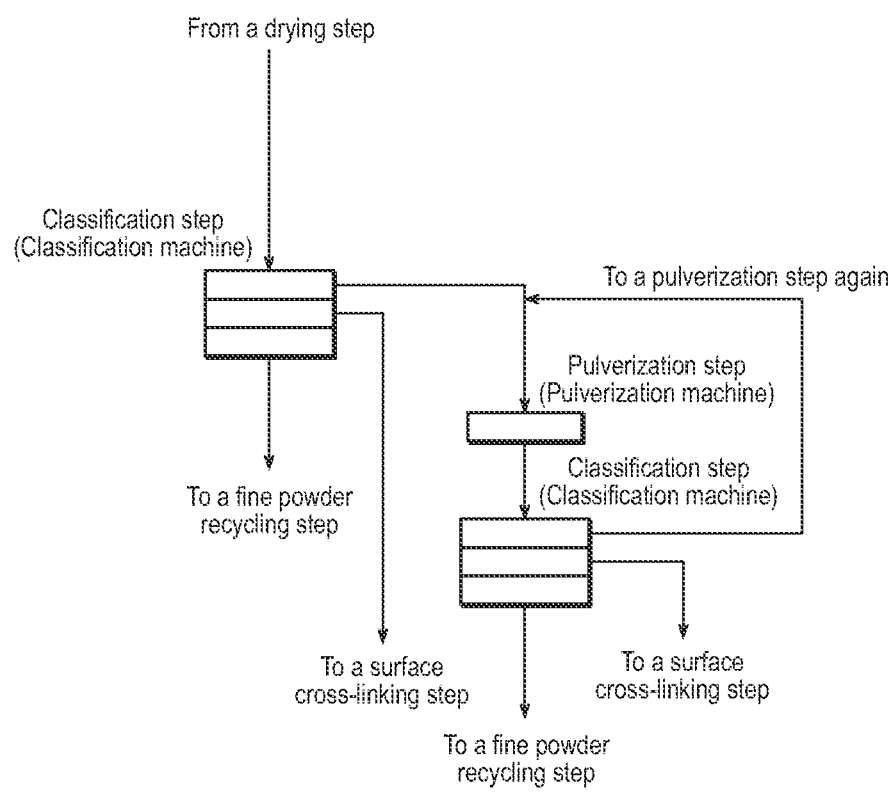
FIG. 3 is a schematic drawing showing a flow of supplying a pulverized polymer to a pulverization step after a classification step, and furthermore to the same pulverization step. It is a conceptual diagram, where the first pulverization step is omitted in the conceptual diagram of FIG. 2, and a dried substance is directly classified at the classification step (the first classification step) and then only the non-passed through substance having objective particle size is supplied to the pulverization step.

To control the circulation pulverization ratio within the above range (larger than 1.50), at least a part of the classified polymer is supplied again to the same or different pulverization step, after the pulverized polymer (the pulverized water-absorbing resin) obtained via the pulverization step is made to a classified polymer (the classified water-absorbing resin) via the classification step. The classification step may be wind force classification or air classification exemplified in WO 2008/123477 or the like, however, from the viewpoint of effect, sieve classification is preferably applied, and in that case, classification is performed using sieves with one or more kinds of sieve mesh sizes. In that case, preferably, two or more kinds, still more three or more kinds of sieves with different sieve mesh size are used in the classification step, and the non-passed through substance (for example, particles having a particle diameter of 850 μm or larger) including the topmost portion thereof is pulverized again, and the classified polymer of the passed through substance (for example, particles having a particle diameter below 850 μm) is supplied to the surface cross-linking step. Still more preferably, the non-passed through substance (for example, particles having a particle diameter of 850 μm or larger) including the topmost portion thereof is pulverized again, and the passed through substance (for example, particles having a particle diameter below 850 μm) from which fine powder (for example, particles having a particle diameter below 150 μm) is removed is supplied to the surface cross-linking step. A suitable flow is shown in FIG. 1 to FIG. 3. It should be noted that, in FIG. 1 to FIG. 12, to enhance and stabilize properties, the pulverization step or the classification step is preferably performed at a certain temperature or higher (still more, it is a depressurization step) to be described later, in addition, distance between the steps is each connected preferably by pneumatic transportation (at a dew point of 0° C. or lower).

Number of sieves or a sieve mesh size (μm) to be used in the present invention is determined as appropriate, and the sieve mesh size may be only one kind (classification of the non-passed through substance and the passed through substance), however, from the viewpoint of enhancing properties, different large and small sieve mesh sizes of two or more kinds, preferably 3 to 6 kinds, and still more preferably 4 to 6 kinds are used, wherein the sieve mesh sizes are selected as follows: a larger sieve with 710 to 200 μm, a middle sieve with 850 to 150 μm, a smaller sieve with 300 to 45 μm, still more 250 to 106 μm or the like. In addition, in the present invention, for objective particle size (for example, 850 to 150 μm), a sieve for removing the non-passed through substance (or a sieve for removing fine powder) may be only one (for example, 850 μm), and may still be two or more kinds (in particular, two kinds, for example, 850 μm and 2 mm), and also as a sieve for fine powder removal, one kind or two or more kinds (in particular, two kinds) are used similarly.
(Circulation to the Same or Different Pulverization Step (a Pulverization Machine))

In the present description, as shown in FIG. 1, it is preferable that predetermined amount of the classified polymer via the classification step, in particular, predetermined amount of the non-passed through substance is supplied again to the same pulverization step before the classification step. In the present description, in classification of the non-passed through substance having objective particle size, classification of 100% generally requires a long period of time, therefore it may be allowed that object particle size (for example, 850 to 150 μm) or fine powder (150 μm) is included in some degree in the non-passed through substance (for example, 850 μm or larger) to be removed. In addition, also as for classification to the object particle size, fine powder may be included in some degree. By circulation using the same pulverization machine, properties can be enhanced, such as liquid permeability or damage resistance, without requiring use of a new pulverization means. In the case where the classified polymer is supplied to the same pulverization machine, circulation pulverization ratio can be specified, by dividing total supply amount (derived from the drying step and derived from the circulation step) to such one pulverization machine, by amount of the dried substance. In the present description, to solve the problem of the present invention, preferably, the pulverization means is a roll-type pulverization machine to be described later. It is preferable that pulverization with the same or different roll-type pulverization machine is performed, also before circulation and after circulation. It should be noted that, in the case of using a different roll-type pulverization machine in the pulverization step after circulation, size or conditions of each pulverization machine may be different or the same.

In addition, as shown in FIG. 2 or FIG. 3, it is also preferable that the classified polymer is supplied to a different classification step (the second classification step) via a different pulverization step (the second pulverization step). In the present description, in the case of circulation to a different pulverization machine (at or subsequent to the second pulverization step), that is, in the case of supplying the classified polymer to a different pulverization machine, circulation pulverization ratio can be specified, by dividing total supply amount to such a plurality of pulverization machines (derived from the drying step and derived from the circulation step; for example, the pulverization machine 1 and the pulverization machine 2), by amount of the dried substance. In the present description, to solve the problem of the present invention, preferably, any of the pulverization machines is a roll-type pulverization machine to be described later. Still more, in the case where the classified polymer is supplied to a different pulverization machine (the second pulverization machine/the second pulverization step) or to a different pulverization machine and classification machine (the second pulverization machine and the second classification machine), in the circulation step of the present invention, by adopting setting condition of such pulverization step at a different condition from the pulverization step before circulation and the circulation step (the first pulverization machine and the first classification machine), control of particle diameter becomes easy, and still more properties of the obtained water-absorbing resin can also be enhanced. That is, multi-stage pulverization (preferably, a roll-type pulverization machine) and/or (preferably, and) multi-stage classification (preferably, sieve classification), shown in FIG. 2 or FIG. 3, are preferable from the viewpoint of enhancing properties of the obtained water-absorbing resin. In the present description, the multi-stage shall be 2 or more stages (2 or more units of the pulverization machines and classification machines in series), preferably 2 to 10 stages (2 to 10 units in series), stillmore preferably 2 to 6 stages (2 to 6 units in series), and particularly preferably 3 to 5 stages (3 to 5 units in series).

Figure 5A:
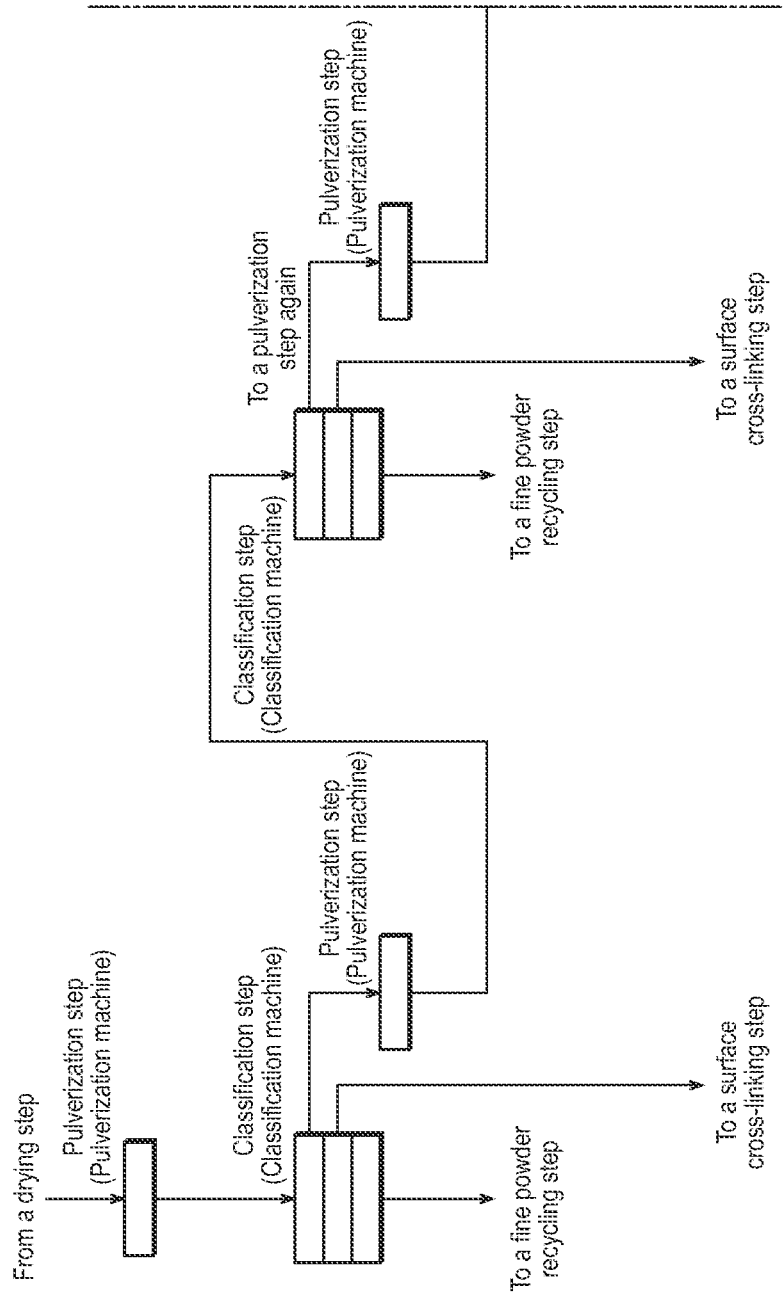
FIG. 5 is a conceptual diagram, where one pulverization step and one classification step are further added in the conceptual diagram of FIG. 4, and has further a fourth classification step and a third pulverization step in FIG. 4, where the non-passed through substance at the fourth classification step is circulated to the third pulverization step.
Figure 5B:
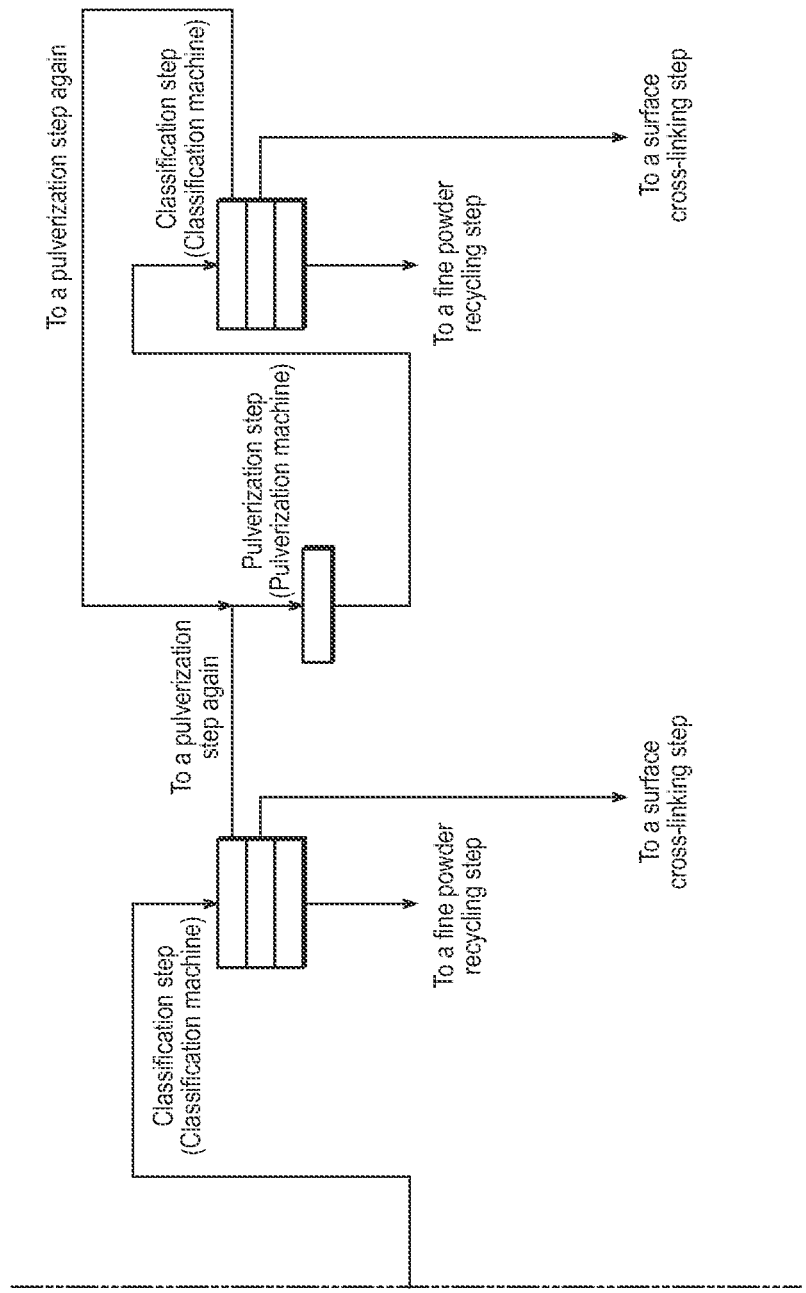
Figure 6A:
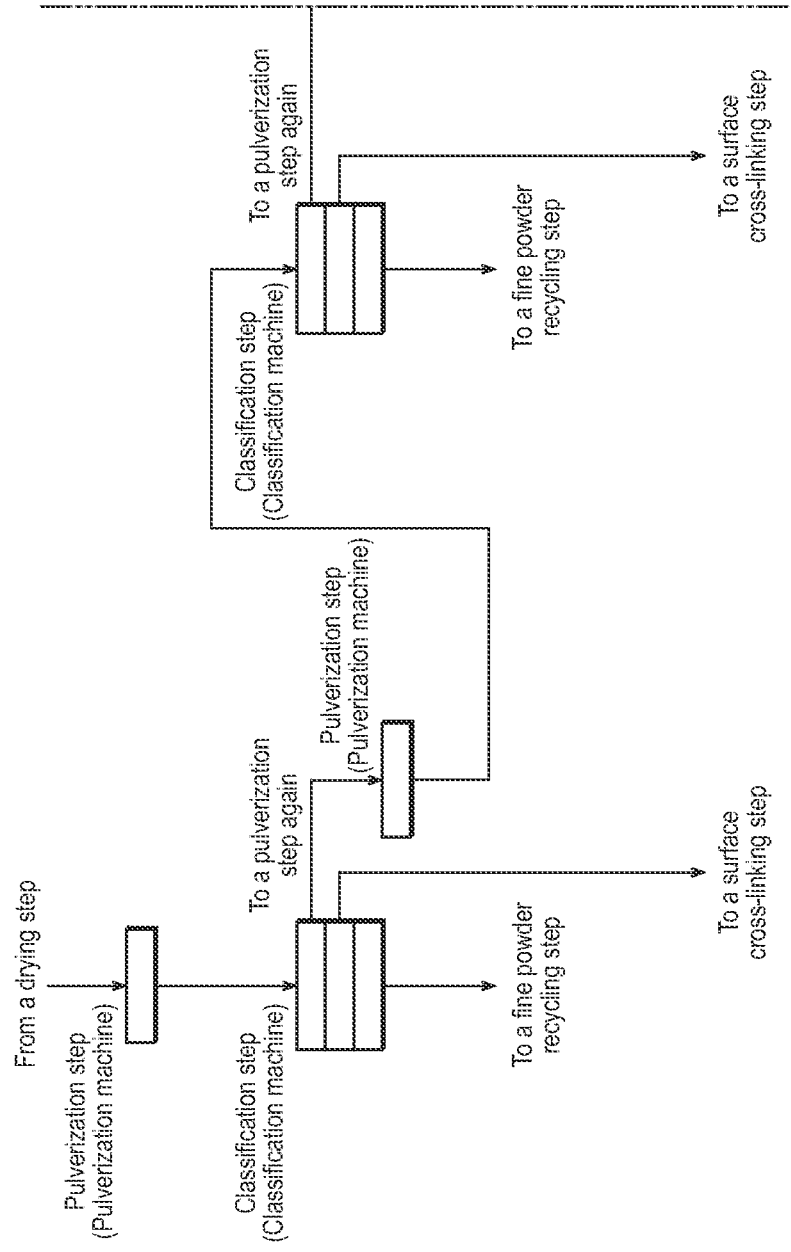
FIG. 6 shows that the non-passed through substance at the fourth classification step is circulated to the second pulverization step, in the conceptual diagram (the non-passed through substance at the fourth classification step is circulated to the third pulverization step) of FIG. 5.
Figure 6B:
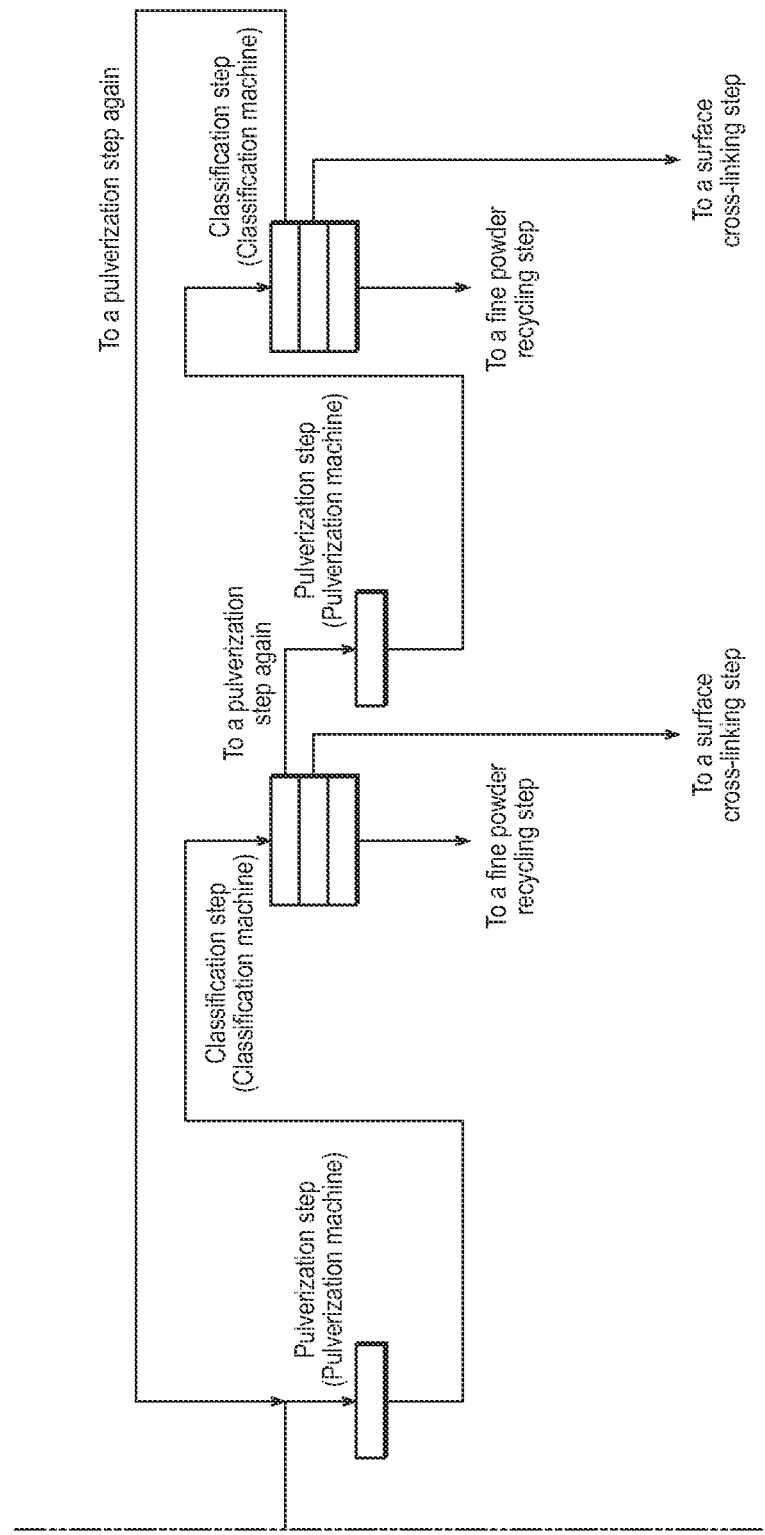
Figure 11A:
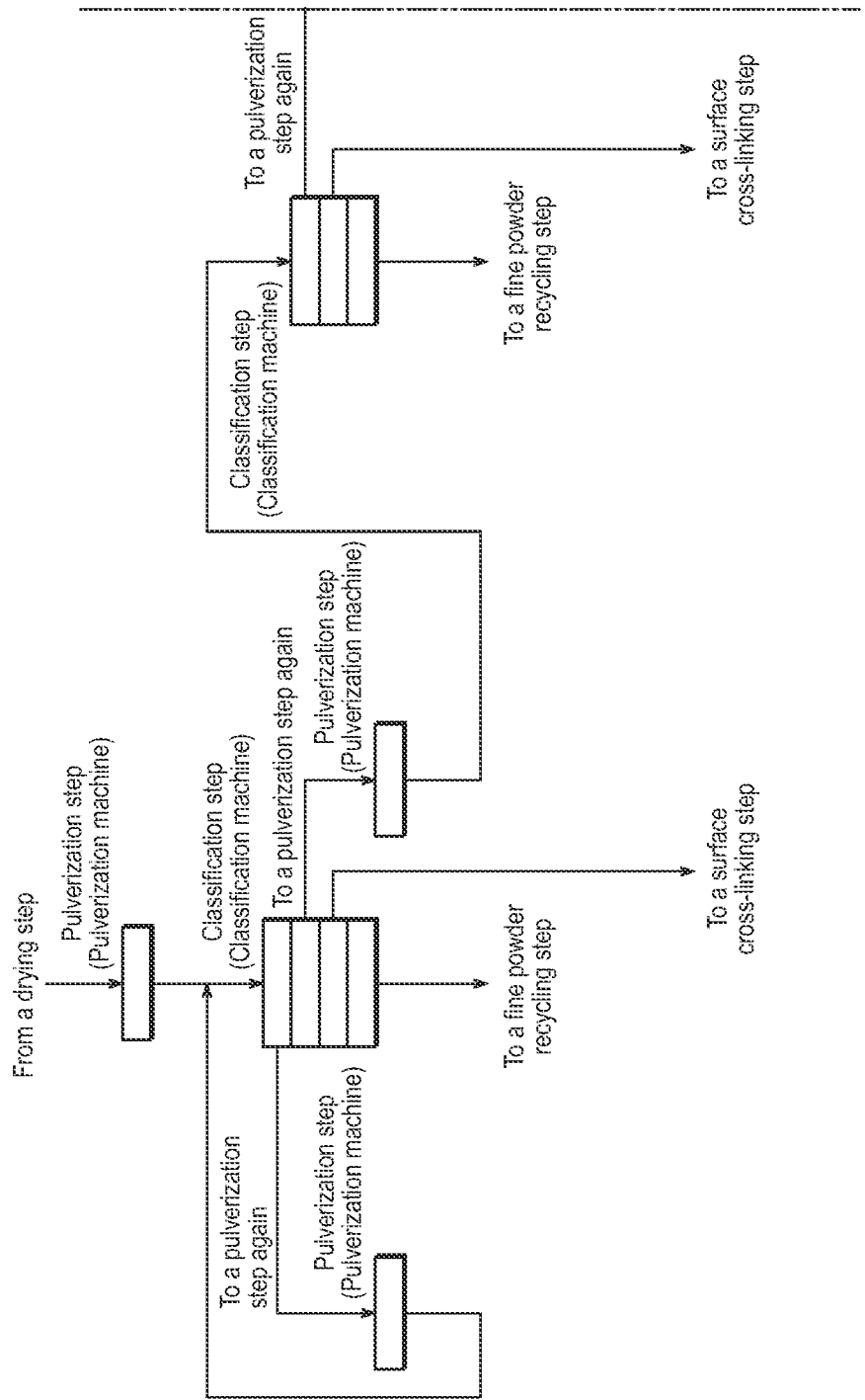
FIG. 11 is a conceptual diagram, where the "non-passed through substance (coarse particles)" at the first classification step is classified to two (large and small) particle sizes (for example, 5 mm to 850 μm as a small coarse particle, and 5 mm to non-passing through as a large coarse particle); the obtained two kinds of "non-passed through substances" are supplied to different pulverization steps (a pulverization step 1, and a pulverization step 1'), as in the conceptual diagram of FIG. 8, in the conceptual diagram of FIG. 5.
Figure 11B:
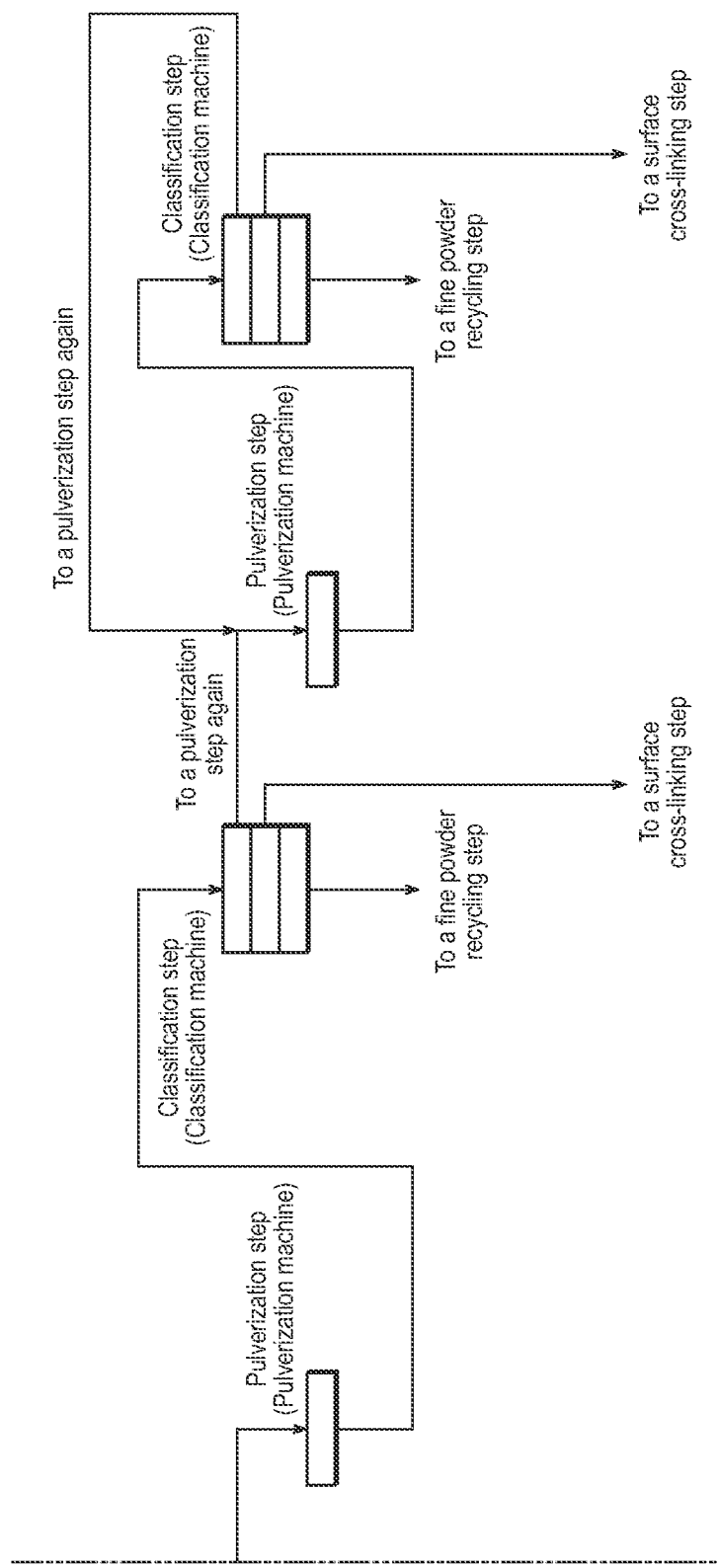

That is, as the most preferable embodiment, multi-stage pulverization (preferably, a roll-type pulverization machine) and multi-stage classification (preferably, sieve classification) are exemplified, where the pulverization step and the classification step shown in FIGS. 5, 6 and 11 or the like are repeated, and preferable number of stages is within the above range. In the present description, in the multi-stage pulverization (for example, including the first pulverization step and the subsequent steps), the roll-type pulverization machine is preferably used respectively, and in that case, the roll of the pulverization machine at each pulverization steps may be 1 stage (1 pair) or may be multi-stage (2 or more pairs).

In addition to the above-mentioned FIG. 2 and FIG. 3, in a similar manner, in FIG. 4 to FIG. 11, a plurality of pulverization steps and a plurality of classification steps are connected in series, and only the no-passed through substance via the classification step (coarser particles than objective particle size) is supplied to the different pulverization step. Fine powder becomes reduced and an apparatus has small load and can be made compact, and still more, properties (for example, liquid permeability or water-absorbing speed) of the water-absorbing resin enhances, as compared with a method where the whole amount is still more pulverized, and thus it is preferable. In the case where such a plurality of pulverization steps and a plurality of classification steps are connected in series, and only the no-passed through substance (coarser particles than objective particle size) via the classification step is supplied to the different pulverization step, properties of the water-absorbing resin are enhanced more, as well as fine powder of the water-absorbing resin other than objective becomes reduced, and still more load of the pulverization step and the classification step can be lowered, and thus it is preferable. In the present description, the pulverization steps and the classification steps to be connected in series, hereafter, may generally be called sequentially a first classification step, a second classification step, a third classification step, - - - , a first pulverization step, a second pulverization step, a third pulverization step, - - - , however, in the present invention, sieve mesh sizes of a plurality of the classification steps, apparatuses (for example, a roll mill and a pin mill) or conditions (for example, roll gap) of the pulverization steps may be the same or may be changed respectively.

In addition, "objective particle size (for example, 850 to 150 μm)" and "fine powder" obtained preferably in the classification step (or the classification step at and the subsequent to the second classification step), in the present invention, is supplied to the next step, for example, to the surface cross-linking step or the fine powder recycling step. In the present description, in the case where the objective particle size may contain fine powder (for example, the substance passed through 850 μm), the fine powder removal at the classification step is arbitrary; each classification step divides to the non-passed through substance and a passed through substance; the non-passed through substance is pulverized again; and the passed through substance is subjected to surface cross-linking or is adopted as a product as it is. In addition, the water-absorbing resin with the objective particle size, obtained at each classification step, is supplied, preferably, to the surface cross-linking step as the next step, however, it may be adopted as a product as it is without surface cross-linking, or may be subjected to a modification step (for example, coating with a polymer, a surfactant, inorganic fine particles or the like) other than surface cross-linking.

Specifically, in FIG. 2, there are provided the first and the second classification steps and the first and the second pulverization steps, where after supplying only the non-passed through substance at the first classification step to the second pulverization step, it is classified again at the second classification step to "objective particle size (for example, 850 to 150 μm)"/a non-passed through substance/fine powder; only the non-passed through substance is supplied to the pulverization step (the second pulverization step P); and (although not shown) the non-passed through substance is supplied to re-pulverization (for example, the first pulverization step or the second pulverization step) as needed.

FIG. 3 is a schematic drawing showing a flow of supplying a pulverized polymer again to a different pulverization step after classification and still more to the same pulverization step. It is a conceptual diagram, where the first pulverization step is omitted in the conceptual diagram of FIG. 2, and a dried substance is directly classified at the classification step (the first classification step) and then only the non-passed through substance having objective particle size is supplied to the pulverization step.

Figure 4:
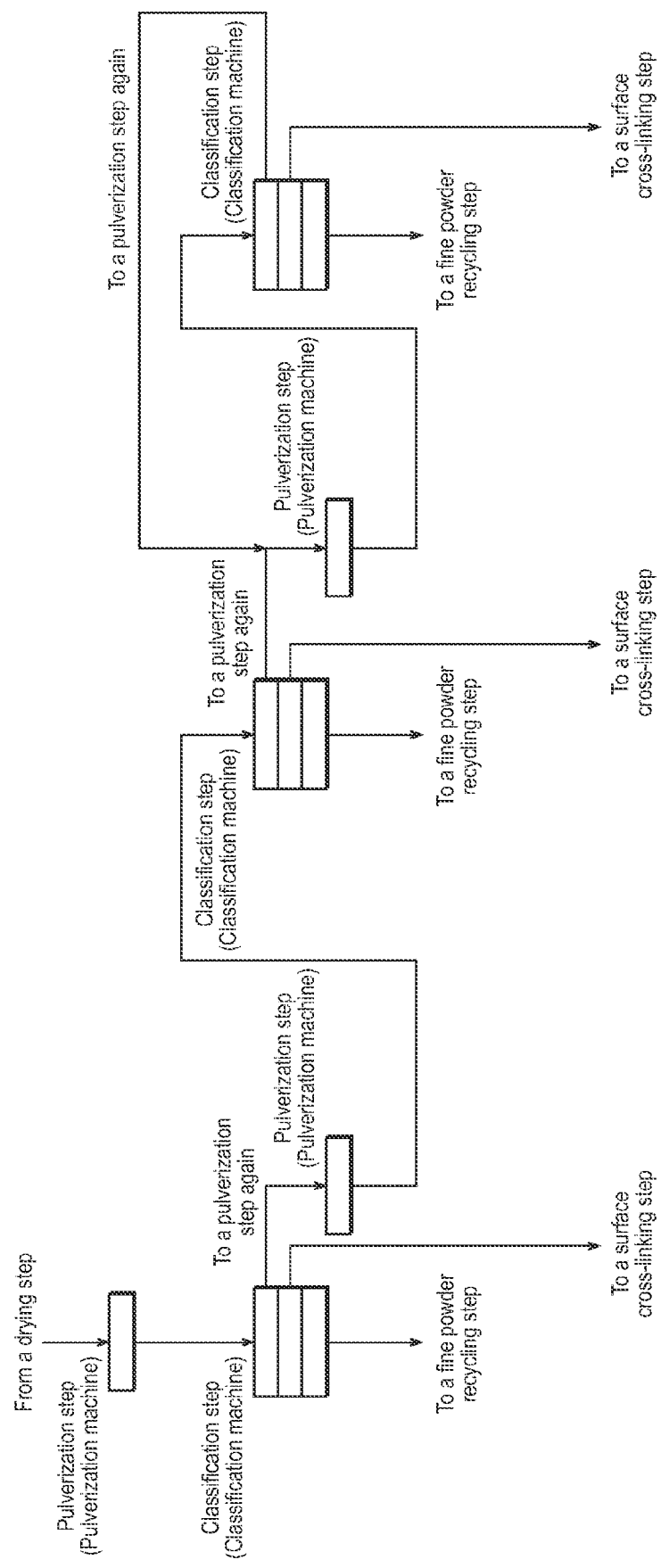
FIG. 4 is a schematic drawing showing a flow, where a classification step (a first classification step) is set after the crushing step for an aggregated dried substance, for classifying to "objective particle size (for example, 850 to 150 μm)"/a non-passed through substance/fine powder, at the first classification step; only the non-passed through substance is supplied to the pulverization step (the first pulverization step); the whole pulverized polymer is classified again at the classification step (the second classification step) to "objective particle size (for example, 850 to 150 μm)"; only the non-passed through substance is supplied to the pulverization step (the second pulverization step); the whole pulverized polymer is classified again at the classification step (the third classification step) to "objective particle size (for example, 850 to 150 μm)"/the non-passed through substance/fine powder; and only the non-passed through substance is circulated to the second pulverization step. The "objective particle size (for example, 850 to 150 μm)" and "fine powder" obtained at the first classification step to the third classification step are supplied to the next step, for example, a surface cross-linking step or a fine powder recycling step. In this case, in the case where the objective particle size may include fine powder (for example, a substance passed through 850 μm), the fine powder removal at the classification step is arbitrary, and each classification step is divided to the non-passed through substance and a passed through substance. In addition, sieve mesh size of the classification step, an apparatus of the pulverization step (for example, a roll mill and a pin pill) or conditions (for example, roll gap) may be the same or may be changed.

FIG. 4 is a schematic drawing showing a flow, where a classification step (the first classification step) is set after the crushing step for an aggregated dried substance, for classifying to "objective particle size"/a non-passed through substance/fine powder at the first classification step; only the non-passed through substance is supplied to the pulverization step (the first pulverization step); the whole pulverized polymer is classified again at the classification step (the second classification step) to "objective particle size"/a non-passed through substance/fine powder; only the non-passed through substance is supplied to the pulverization step (the second pulverization step); the whole pulverized polymer is classified again at the classification step (the third classification step) to "objective particle size (for example, 850 to 150 μm)"/the non-passed through substance/fine powder; and only the non-passed through substance is circulated to the second pulverization step.

FIG. 5 is a conceptual diagram, where one pulverization step and one classification step are further added in the conceptual diagram of FIG. 4, and has further a fourth classification step and a third pulverization step in FIG. 4, where the non-passed through substance at the fourth classification step is circulated to the third pulverization step.

FIG. 6 is a conceptual diagram, where the non-passed through substance at the fourth classification step is circulated to the second pulverization step, in the conceptual diagram of FIG. 5 (the non-passed through substance at the fourth classification step is circulated to the third pulverization step).

FIG. 7 is a conceptual diagram, where the third classification step was omitted, in the conceptual diagram of FIG. 4, and is a schematic drawing showing a flow, where circulation is performed to the second classification step (of FIG. 4) (the second classification step in FIG. 7), after the second pulverization step.

Figure 8:
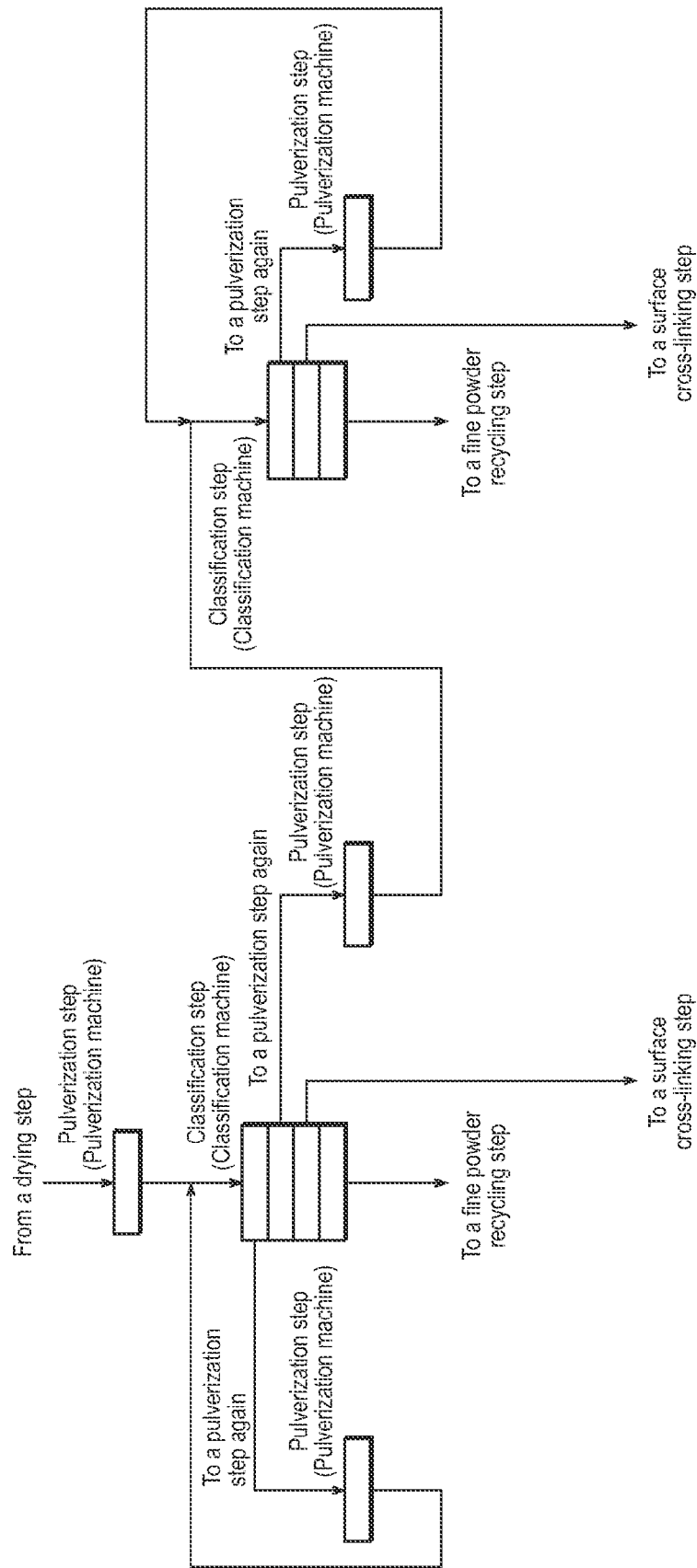
FIG. 8 is a conceptual diagram, where the "non-passed through substance (coarse particles)" at the first classification step is classified to two (large and small) particle sizes (for example, 5 mm to 850 μm as a small coarse particle, and 5 mm to non-passing through as a large coarse particle); the obtained two kinds of "non-passed through substances" are supplied to different pulverization steps (a pulverization step 1, and a pulverization step 1') in the conceptual diagram of FIG. 7. In the conceptual diagram of FIG. 7, the large coarse particle is supplied to the added pulverization step 1' (a pulverization machine at the left of FIG. 8) and circulated to the first classification step.

FIG. 8 is a conceptual diagram, where the "non-passed through substance (coarse particles)" at the first classification step is classified to two (large and small) particle sizes (for example, 5 mm to 850 μm as a small coarse particle, and 5 mm to non-passing through as a large coarse particle); the obtained two kinds of "non-passed through substances" are supplied to different pulverization steps (a pulverization step 1, and a pulverization step 1') in the conceptual diagram of FIG. 7. In the conceptual diagram of FIG. 7, the large coarse particle is supplied to the added pulverization step 1' (a pulverization machine at the left of FIG. 8) and circulated to the first classification step.

Figure 9:
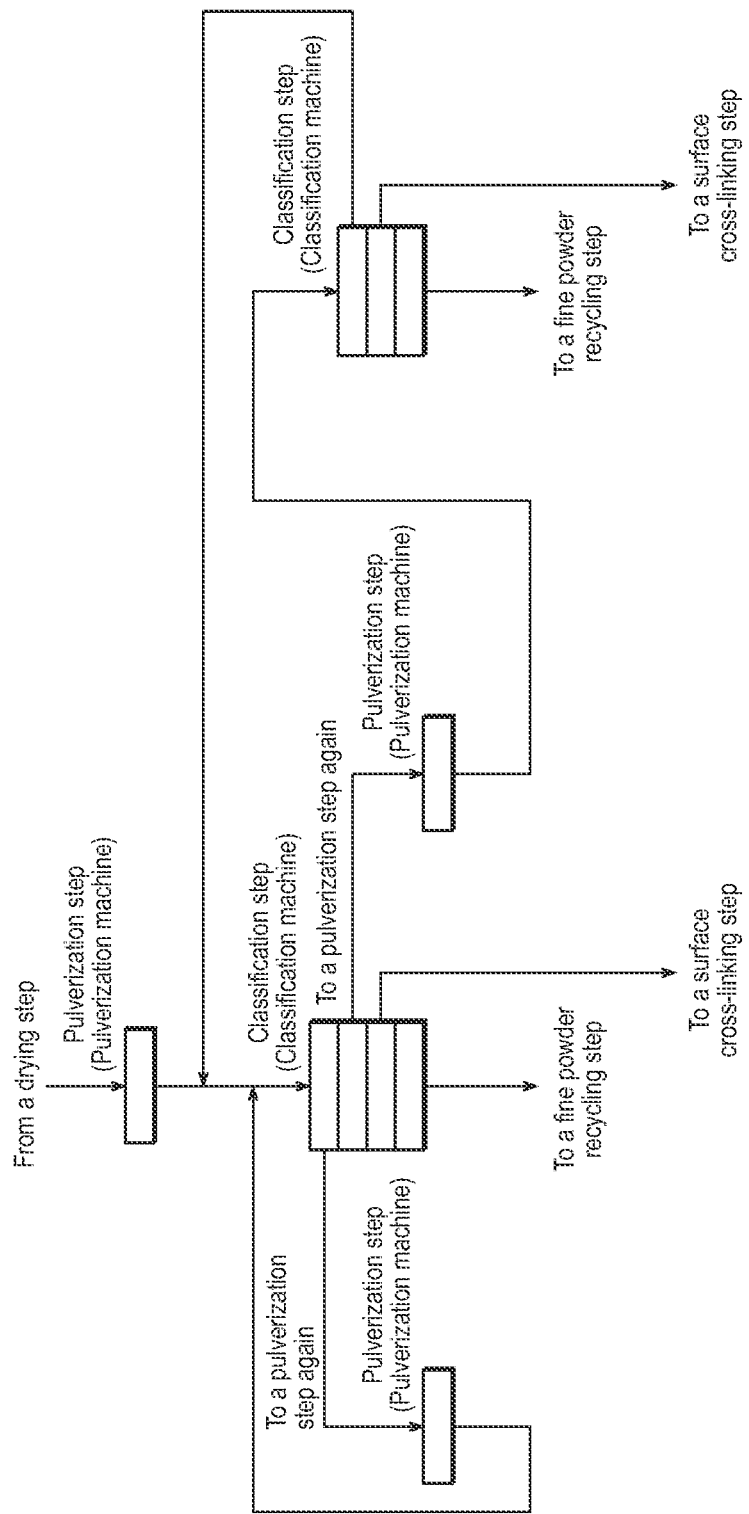
FIG. 9 is a conceptual diagram, where the non-passed through substance at the second classification step is circulated to the first classification step, in the conceptual diagram of FIG. 8 (the non-passed through substance at the second classification step is circulated to the second classification step via the second pulverization step).

FIG. 9 is a conceptual diagram, where the non-passed through substance at the second classification step is circulated to the first classification step, in the conceptual diagram of FIG. 8 (the non-passed through substance at the second classification step is circulated to the second classification step via the second pulverization step).

Figure 10:
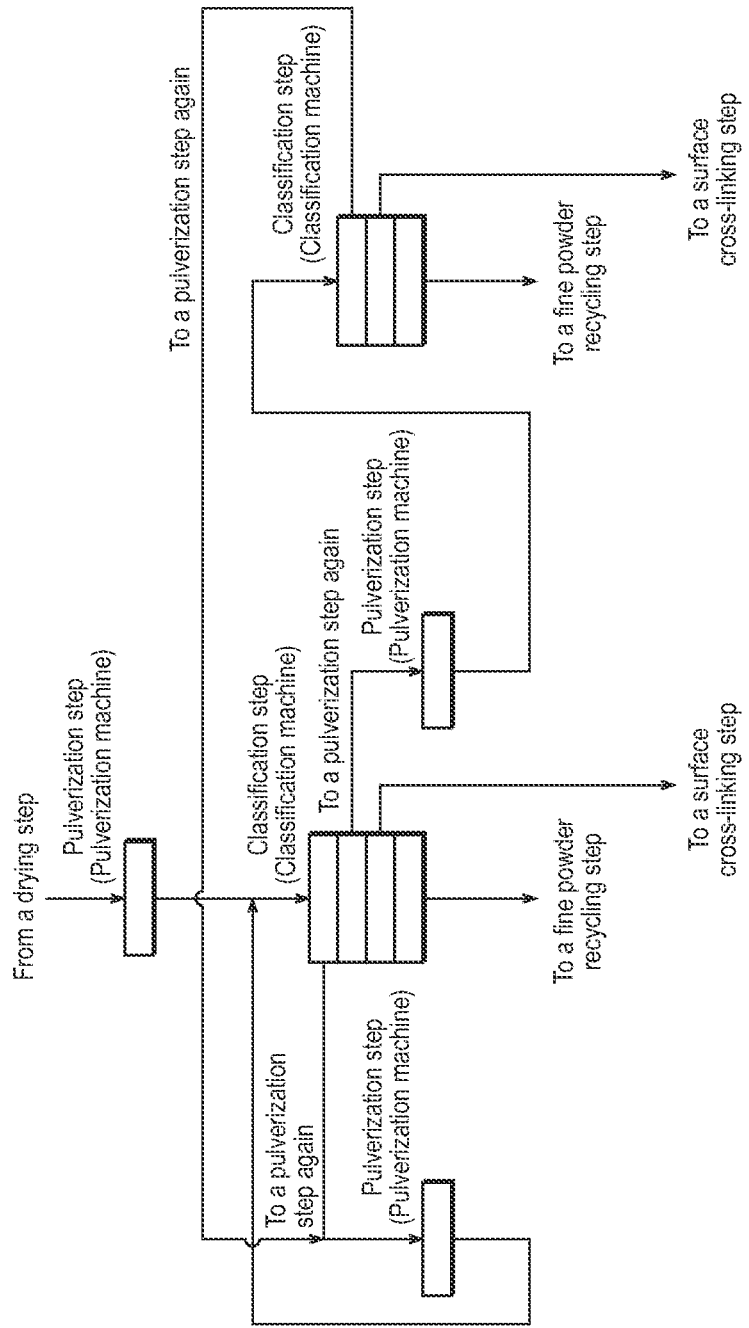
FIG. 10 is a conceptual diagram, where the non-passed through substance at the second classification step is supplied to the pulverization step 1' (a pulverization machine at the left of FIG. 10), and then circulated to the first classification step, in the conceptual diagram of FIG. 8 (the non-passed through substance at the second classification step is circulated to the second classification step via the second pulverization step).

FIG. 10 is a conceptual diagram, where the non-passed through substance at the second classification step is supplied to the pulverization step 1' (a pulverization machine at the left of FIG. 10), and then circulated to the first classification step, in the conceptual diagram of FIG. 8 (the non-passed through substance at the second classification step is circulated to the second classification step via the second pulverization step).

FIG. 11 is a conceptual diagram, where the "non-passed through substance (coarse particles)" at the first classification step is classified to two (large and small) particle sizes (for example, 5 mm to 850 μm as a small coarse particle, and 5 mm to non-passing through as a large coarse particle); the obtained two kinds of "non-passed through substances" are supplied to different pulverization steps (a pulverization step 1, and a pulverization step 1'), as in the conceptual diagram of FIG. 8, in the conceptual diagram of FIG. 5.

In the present invention, using the above-mentioned FIG. 1 to FIG. 11 as preferable representative examples, it is preferable that a plurality of pulverization steps and a plurality of classification steps are connected in series (if needed, a part can be branching in parallel), and only the non-passed through substance via the classification step (coarser particles than objective particle size) is supplied to a different pulverization step. That is, in the present invention, the water-absorbing resin to be circulated has been dried and pulverized. Conventionally, there has been known also technology for removing and, as needed, pulverizing and re-drying a non-dried substance after drying (PATENT LITERATURES 3 to 5), however, PATENT LITERATURES 1 to 5 do not disclose a circulation pulverization ratio of 1.50 or larger, and in the present invention, the classified polymer of the dried substance (preferably having a water content of 10% by weight or lower, 8% by weight or lower, still more 6% by weight or lower, in particular, 4% by weight or lower) is preferably supplied directly to the pulverization step as it is, not to the drying step. Different from the PATENT LITERATURES 3 to 5, where the non-dried substance is removed, in the present invention, the classified polymer to be circulated again to such a pulverization step (preferably, a roll-type pulverization machine and preferably under reduced pressure) is a dried substance (water content of 10% by weight or lower) containing a portion of preferably 10 mm or smaller, 5 mm or smaller, 3 mm or smaller and 2 mm or smaller, in an amount of preferably 80% by weight or more, and particularly preferably 90% by weight or more.

(Production Amount)

Effect of the present invention is exerted significantly in production or industrial continuous production of the water-absorbing resin with high liquid permeability, in particular, in continuing 24 hours or more of a large scale continuous production of the water-absorbing resin with an FSR of a specified value or higher, rather than in a small scale of an experimental room level. Accordingly, preferable production amount is within the above range.

(Pulverization Machine)

A pulverization machine to be used in the pulverization step includes a conventionally known pulverization machine such as a roll mill, a hammer mill, a roll granulator, a jaw crusher, a Gyratory crusher, a cone crusher, a roll crusher, and a cutter mill. From the viewpoint of particle size control, a roll-type pulverization machine such as the roll mill or the roll granulator is used particularly preferably in multi-stage (preferably 2 to 10 stages, and more preferably 2 to 4 stages). It should not be noted that, in the case of using the roll-type pulverization machine in multi-stage, a plurality of the roll-type pulverization machines may be connected up and down, or, as shown in the above FIG. 2 to FIG. 11, after a one-stage roll-type pulverization machine, another one-stage roll-type pulverization machine may be installed with sandwiching the classification step between them, and also this case shall be encompassed in the concept of the multi-stage pulverization (multi-stage roll-type pulverization machines) so called in the present invention.

That is, among these pulverization machines, use of the roll-type pulverization machine is preferable in the pulverization step. In still more other preferable embodiment, the roll-type pulverization machine and another pulverization machine are used in combination in the pulverization step. In addition, it is preferable that these pulverization steps are performed under reduced pressure of the following range. By operation under reduced pressure, liquid permeability (SFC) is enhanced more. Preferable degree of reduced pressure is as described below.

In the roll-type pulverization machine, diameter of a roller (for example, 10 to 1000 mm), length (100 to 5000 mm), pitch, clearance, roll gap, roller material, pressure range between rollers (nearly 0 to over 80 N/mm), roller speed, speed ratio (constant speed or non-constant speed), scraper, pitch, clearance, and the like may be determined as appropriate.

(Reduced Pressure State)

In the present invention, from the viewpoint of properties enhancement (example: absorbency against pressure, liquid permeability) or pulverization efficiency, the pulverization step is preferably performed under reduced pressure, and still more preferably, the classification step is also performed under reduced pressure. In the present description, "a reduced pressure state" means that air pressure is in a state lower than atmospheric pressure, and is represented by a plus value of "a degree of reduced pressure". That is, provided that atmospheric pressure is standard air pressure (101.3 kPa), "a degree of reduced pressure is 10 kPa" means that air pressure is 91.3 kPa. In the present invention, the lower limit of the degree of reduced pressure is preferably over 0 kPa, more preferably 0.01 kPa or higher, and still more preferably 0.05 kPa or higher. In addition, from the viewpoint of preventing hanging up of a powder in a classification apparatus, and cost reduction of an discharge apparatus or the like, the upper limit of the degree of reduced pressure is usually 30 kPa or lower, preferably 10 kPa or lower, more preferably 5 kPa or lower, and still more preferably 2 kPa or lower. A preferable numerical value range of degree of reduced pressure may be selected arbitrarily between the above upper limit value and the lower limit value.

(Heating)

In the present invention, from the viewpoint of properties enhancement (example: absorbency against pressure, liquid permeability), the pulverization step is preferably performed at certain temperature or higher, and still more preferably, the classification step is also performed at certain temperature or higher. In the present invention, it is set at preferably 35° C. or higher, and still more 40 to 100° C., 50 to 90° C., and 60 to 80° C. To maintain such a certain temperature or higher, the pulverization step and/or the classification step are heated (external heating) or warmed (preferably, made heat insulation).

It should be noted that temperature of the pulverization step or the classification step is specified by temperature of the inside surface of the apparatus or of the water-absorbing resin (the classified polymer, the pulverized polymer), and preferably temperature of the water-absorbing resin (the classified polymer, the pulverized polymer), still more temperature of both of the inner surface of the apparatus are set at the above temperature. As a means for controlling the temperature of the water-absorbent resin at the above range, the water-absorbent resin may be in a heated state including by heat radiation or cooling from completion of the drying step (if needed, it can be warmed or heated after the drying step). In addition, a means for controlling the temperature of the pulverization machine or the classification machine at the above range may be heat transfer from the water-absorbent resin at the above range, or may be warming or heating of the apparatus as appropriate.

(Particle Size)

In the present invention, by obtaining the water-absorbing resin having an objective particle size via the pulverization step and the classification step (still more, by mixing the water-absorbing resin from a plurality of the classification steps as needed), particle size is controlled, and preferably surface cross-linking is further performed. Weight average particle diameter (D50) before surface cross-linking is adjusted at 200 to 600 μm, preferably 200 to 550 μm, more preferably 250 to 500 μm, and particularly preferably 350 to 450 μm. In addition, the less is the particles having a particle diameter below 150 μm is the better, and it is adjusted usually at 0 to 5% by weight, preferably 0 to 3% by weight, and particularly preferably 0 to 1% by weight. Still more, the less is the particles having a particle diameter 850 μm or larger (still more, 710 μm or larger) is the better, and it is adjusted usually at 0 to 5% by weight, preferably 0 to 3% by weight, and particularly preferably 0 to 1% by weight. In addition, in the present invention, surface cross-linking is performed at a ratio of the particles having a particle diameter of 850 to 150 μm, still more ratio of the particles having a particle diameter of 710 to 150 μm, is preferably 95% by weight or more, still more 98% by weight or more (the upper limit is 100% by weight). Logarithm standard deviation ($\sigma\zeta$) of the particle size distribution is set at 0.25 to 0.45, preferably 0.30 to 0.40, and more preferably 0.32 to 0.38. Measurement methods for these properties are described in WO 2004/069915 or EDANA-ERT420.2-02, using standard sieves. The above particle size before surface cross-linking is also applied preferably to after surface cross-linking, and still more to a final product (another name: a water-absorbing agent or a particulate water-absorbing agent). For particle size control also after surface cross-linking, there may be installed a classification step, a crushing step (an operation for loosening a substance aggregated at the surface cross-linking), a granulation step (reduction of fine powder, or increase in average particle diameter by binding particles) or the like, and preferably the classification step is installed also after surface cross-linking.

Density (specified by ERT460.2-02) of the water-absorbing resin is preferably 0.50 to 0.80 [g/cm$^3$], and more preferably 0.60 to 0.70 [g/cm$^3$]. The case where density does not satisfy the above range may provide difficulty in control of stirring power index, decrease properties or increase powder in some cases.

(5) Transportation Step and Circulation Step

In the present invention, it is preferable that step between the pulverization step and the classification step, and step before and after them are connected by a transportation apparatus. A transportation machine to be used in the above transportation step, as the transportation apparatus to be used, includes, for example, a belt conveyor, a screw conveyor, a chain conveyor, a vibration conveyor, a pneumatic conveyor or the like, and the one provided with a heating means and/or a warming means of the inner wall surface thereof from outside. These transportation steps are performed under reduced pressure or a pressurized state.

Among these transportation machines, pneumatic transportation is preferable. Pneumatic transportation of the water-absorbing resin has been exemplified in WO 2007/104657, WO 2007/104674, WO 2007/104676, however, among such pneumatic transportation, carrying is preferably performed at a dew point of 0° C. or lower. Pneumatic transportation of the present invention may be pressurized transportation, or may be reduced pressure transportation. Pressure to be used may be determined as appropriate, however, it is, for example, in a range of −0.8 bar to 10 bar.

In a preferable transportation method for the water-absorbing resin, pneumatic transportation is used at least at a part of step between the pulverization step and the classification step, and before and after them, and preferably at step between the pulverization step and the classification step and before and after them. From the viewpoint of maintaining superior properties of the water-absorbing resin powder stably, it is preferable that dried air is used as primary air, and secondary air to be used as needed. Dew point of this air is 0° C. or lower, still more −5° C. or lower, preferably −10° C. or lower, more preferably −12° C. or lower, and particularly preferably −15° C. or lower. In considering cost performance, a range of dew point is −100° C. or higher, preferably −70° C. or higher, and still more it is enough at about −50° C. Still more it is preferable that temperature of gas is 10 to 40° C., and still more about 15 to 35° C.

Other than using dried gas (air), heated gas (air) may also be used. A heating method is not especially limited, however, gas (air) may be heated directly using a heat source, or gas (air) to be passed may be heated indirectly by heating the transportation part or a pipeline. Lower limit temperature of this heated gas (air) is preferably 20° C. or higher, and more preferably 30° C. or higher, while the upper limit is below 70° C., and more preferably below 50° C.

As a method for controlling the dew point, gas, preferably air may be dried as appropriate. Specifically, a method for using a membrane dryer, a method for using a cooling adsorption-type dryer, a method for using a diaphragm dryer, or a method for using these in combination are included. In the case of using the adsorption-type dryer, it may be a heating regeneration-type, or may be a non-heating regeneration-type, or may be a non-regeneration-type.

(6) Classification Step

The water-absorbing resin powder pulverized in the above is classified before surface cross-linking, and still more also after surface cross-linking (in particular, sieve classification), in subjecting to pulverization and classification with the above circulation pulverization ratio. A sieve classification method for the water-absorbing resin has been exemplified, for example, in U.S. Pat. No. 6,164,455 (PATENT LITERATURE 50), WO 2006/074816 (PATENT LITERATURE 51), WO 2008/03672 (PATENT LITERATURE 52), WO 2008/037673 (PATENT LITERATURE 53), WO 2008/03675 (PATENT LITERATURE 54), and WO 2008/123477 (PATENT LITERATURE 55). Description will be given below on a suitable classification method applicable to the present invention, in particular, a sieve classification method (removal of electricity or the like).

(Classification Apparatus)

A classification apparatus to be used in the present invention is not especially limited, as long as it has a sieve mesh face, and includes, for example, the one to be classified to a vibrating screen and a shifter. In addition, shape of the sieve mesh face is determined as appropriate from a round-type (a round-sieve), a square-type (a square-sieve) or the like. The vibrating screen includes inclined shape, Low-head shape, Hum-mer, Rhewum, Ty-Rock, Gyrex and Eliptex or the like, and the shifter includes Reciprocating shape, Exolon-grader, Traversator-sieve, Sauer-meyer, Gyratory, Gyro-shifter and Ro-tex screen or the like. They are sub-classified by moving shape of the mesh face: circle, ellipse, linear line, arc, pseudo-ellipse, spiral; the vibration system: free vibration, forced vibration; the drive method: eccentric shaft, non-even load weight, electromagnet, impact; inclination of the mesh face: a horizontal system, an inclined system; the installation method: a floor-type, hang-down-type, or the like.

Among them, from the viewpoint of effect of the present invention, a classification apparatus for moving the sieve mesh face in spiral is preferable, by combination of radial inclination (inclination of a sieve mesh for dispersing a material from the center to the circumference) or tangential inclination (inclination of a sieve mesh for controlling discharge speed on the mesh), such as a oscillation system (tumbler shifter, tumbler-screening machines).

(Depressurization)

To solve the problems of the present invention, it is preferable that in addition to the pulverization step, the classification step is also depressurized in a similar range as explained on the pulverization step.

(Heating)

To solve the problems of the present invention, it is preferable that in addition to the pulverization step, the classification step is also adjusted at a constant temperature similarly as explained on the pulverization step.

(A Classification Mesh)

In the present invention, the water-absorbing resin powder is classified using a classification mesh. As the classification mesh, various standard sieves such as, for example, JIS, ASTM, TYLER-type and the like, are exemplified. These sieves may be a plate sieve, or a mesh sieve, and shape of the mesh sieve is selected as appropriate, with reference to JIS Z8801-1(2000) or the like. A sieve mesh size of the standard sieve is selected from a range of 100 mm to 10 μm, and still more 10 mm to 20 μm, and one kind or two or more kinds of the sieves, in particular, a metal sieve is used.

The sieve may be a classification-type only for the upper part, or a classification-type only for the lower part, however, simultaneous classification of the upper limit and the lower limit, that is, use of a plurality of sieves at the same time, is preferable, and use of sieves with at least three kinds of different sieve mesh sizes is still more preferable, from the viewpoint of properties enhancement. As such a method, it is preferable to use an intermediate sieve or a higher level sieve, other than the upper and lower predetermined sieves. As a suitable sieve, for example, the one having the upper limit of 850 μm, or 710 μm, or 600 μm, and the one having the lower limit of about 150 μm, or 225 μm are used, and still more, a sieve may be added at the middle or the upper part thereof.

(Classification Vibration)

A sieving apparatus suitable for the classification method in the present invention is not especially limited, however, it is preferable to use a plane classification method, and in particularly preferably, a tumble-type sieving apparatus. This sieving apparatus is typically vibrated to support classification. This vibration is performed in such a degree that a product to be classified is introduced on a sieve in spiral. These forced vibrations have an eccentricity amount of typically 10 to 100 mm, and preferably 25 to 40 mm, and a rotation number of 60 to 600 rpm, and preferably 100 to 400 rpm.

(Air Flow)

It is preferable that gas flow, in particularly preferably air is passed through on the water-absorbing resin during classification. This gas amount is typically 0.1 to 10 [$m^3$/hr], preferably 0.5 to 5 [$m^3$/hr], and particularly preferably 1 to 3 [$m^3$/hr], per 1 $m^2$ of sieve area, and in this case, gas volume is measured under standard condition (25° C. and 1 bar). Particularly preferably, gas flow is heated before introducing to the sieving apparatus typically at least at 40° C., preferably at least at 50° C., still more preferably at least at 60° C., specially preferably at least at 65° C., and particularly preferably at least at 70° C. Temperature of gas flow is usually below 120°

C., preferably below 110° C., more preferably below 100° C., still more preferably below 90° C., and particularly preferably below 80° C.

Dew point of airflow (gas flow) is preferably 20° C. or lower, more preferably 15° C. or lower, still more preferably 10° C. or lower, and particularly preferably 0° C. or lower. The lower limit value of the dew point is not especially limited, however, in consideration of cost performance, it is preferably about −5° C.

(Removal of Electricity)

In the present invention, preferably removal of electricity is performed in sieve classification, and still more also electricity is removed in the pulverization step. By performing such removal of electricity, properties, in particular, liquid permeability (for example, SFC) of the surface cross-linked water-absorbing resin enhances. Such effect is exerted significantly in production or industrial continuous production of the water-absorbing resin with high liquid permeability, in particular, in continuing 24 hours or more of continuous production of the water-absorbing resin with high SFC (for example, SFC is 10 or more), in a scale of 1 t/hr or more, rather than in a small scale of an experimental room level.

In the present invention, preferably removal of electricity is performed in the classification step. Removal of electricity is performed for at least one of the classification apparatus, the water-absorbing resin and the sieve, however, because these three are contacted each other at the classification step, it is enough that electricity is removed from any one of them, and preferably electricity is removed from the apparatus or the sieve itself.

As the removal method for electricity, for example, the following methods (A) to (C) is applicable, however, it is not especially limited to these. Leakage current taken out in such removal of electricity is made flown to the earth through grounding (earth) preferably shown by the following grounding resistance value.

(A) An electricity removal brush: removal of electricity from the sieve face where static electricity generated.
(B) An ion generation brush: removal of electricity by generation of ions by applying high voltage.
(C) Grounding (earth): removal of electricity of static electricity generated at a rotating substance, a rotating axis, a rotating body, or an apparatus.

In the case of using the above (A) electricity removal brush, a self-discharge method may be used, where a little clearance is made between the electricity removal brush and a charged substance, or a ground leaking method may be used, where the grounded electricity removal brush is contacted with the charged substance to take out accumulated static electricity as leakage current. Such a electricity removal brush is produced using stainless fiber, carbon fiber, amorphous fiber, chemical fiber, plant fiber, animal hair or the like, and wire diameter thereof is about 1 to 100 μm, still more 5 to 20 μm, and a wire length is 1 to 100 μm, and particularly preferably it is fabricated to ultra-fine stainless fiber.

For example, the above (B) includes a static eliminator (ionizer), where charged amount and electrification charge of the classification apparatus or the water-absorbing resin are measured, to furnish the opposite charge to plus charge or minus charge, and to make it neutral electrically. It is enough to attain both optimal electricity removal and ion balance control, in response to a charged state of an object. As for charged amount of the object, ion current may be measured using an ion current detection circuit built-in in a controller. The method (B), where static electricity is made powerless by neutralization using a charge having reversed polarity, is a preferable method for the water-absorbing resin. Such an electricity removal method generates ions in air or other gas to neutralize the electrification charge by the ions. Therefore, the electricity removal apparatus is also called an ionizer.

The case of using the above (C) grounding is a method for electricity removal, by connecting a building where an apparatus is installed, or a stand to ground having a grounding resistance value shown below; electrically connecting the apparatus to the building or the stand; contacting a charged substance to the apparatus so as to take out accumulated static electricity as leakage current. This method is simple and easy, and has high effect because the whole apparatus works as an electricity removal apparatus, and is thus one of the preferable methods for the water-absorbing resin.

A grounding resistance shows a resistance value against current flowing from an earth electrode, buried in soil for grounding, to the ground. As the measurement method, a commercial earth-resistance meter is used. A preferable range of the grounding resistance value is 100Ω or lower, more preferably 10Ω or lower, and still more preferably 5Ω or lower.

(Guide)

In the present invention, it is also preferable that the sieve of the classification apparatus has a guide for the water-absorbing resin. Installation of such a guide enables more efficient classification. Such a guide apparatus works to guide or the like the water-absorbing resin powder to the center part of the sieve, and length thereof is determined in about 5 to 40% of the diameter.

(Material and Surface Roughness)

The material of the sieving apparatus may be selected as appropriate from a resin or a metal or the like, however, as compared with a sieve coated with a resin, exemplified in JP-A-11-156299, preferably the case of a metallic sieve including a contact surface with the water-absorbing resin, in particular, a stainless sieve, exerts effect of the present invention more.

In addition, from the viewpoint of properties enhancement, surface roughness of the sieve apparatus is preferably 800 nm or smaller. A material of the sieving apparatus is preferably stainless steel. By mirror finishing of the stainless steel, properties is enhanced more. The stainless steel includes SUS304, SUS316, SUS316L or the like.

In the present invention, it is preferable that the inner surface of the sieving apparatus is controlled to have a surface roughness (Rz), specified by JIS B 0601-2001, of 800 nm or less. It is preferable to be smoothened to have a surface roughness (Rz) of preferably 150 nm or less, still more preferably 50 nm or less, and 25 nm or less. It should be noted that Rz means the maximum value of the maximum height (μm) of surface irregularity. Such surface roughness may be measured in accordance with JIS B 0651-2001, using a stylus type surface roughness measuring meter.

(7) Fine Powder Recycling Step

In the present invention, fine powder is preferably recycled. That is, a preferable embodiment further includes a step for recycling the water-absorbing resin fine powder after the classification step, before the drying step. Recycling of fine powder is capable of contributing to particle size control or enhancement of water-absorbing speed or liquid permeability. Recycling amount of fine powder is in a range of 0.1 to 40% by weight, still more 1 to 30% by weight, and particularly 5 to 25% by weight, in the pulverized polymer.

As a recycling method of fine powder, a known method is used, including recycling to a monomer (for example, U.S. Pat. Nos. 5,455,284, 5,342,899, 5,264,495, US-A-2007/0225422), recycling to polymer gel (US-A-2008/0306209, U.S. Pat. Nos. 5,478,879, 5,350,799), recycling to the granulation step (U.S. Pat. Nos. 6,228,930, 6,458,921), recycling to a gelling step (U.S. Pat. Nos. 4,950,692, 4,970,267, 5,064,582), or the like, however, among these, recycling to the polymerization step or the drying step (after granulation or hydration, as needed) is preferable.

(8) Number of Apparatuses at and Subsequent to the Classification Step

Figure 12:
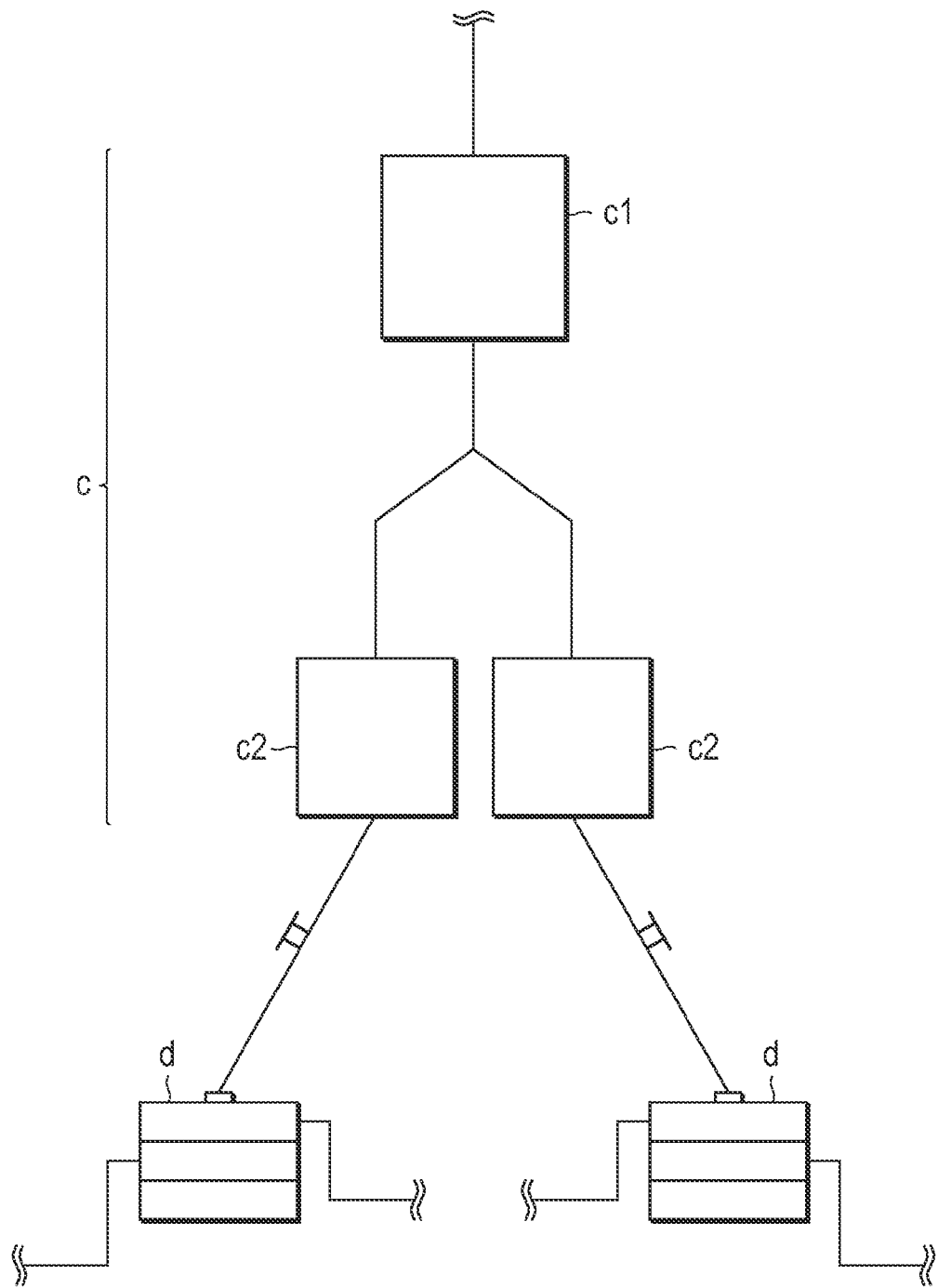
FIG. 12 is a schematic drawing showing compositions of pulverization apparatuses (c1 and c2) and a classification apparatus (d) which can be used in the production method of the present invention. In this case, pulverization apparatuses (c1 and c2) are connected in series, and the water-absorbent resin is equally divided to two after the pulverization step c1, and the pulverization step c2 (the pulverization apparatus c2) and the classification step d (the classification apparatus d) are set as two lines in parallel.

In the present invention, from the viewpoint of properties enhancement, the polymerization step is performed by continuous belt polymerization or continuous kneader polymerization, and as shown in FIG. 12, it is preferable that a plurality of the pulverization steps and/or the classification steps, still more the surface processing step are performed in parallel for the polymerization step. By operating the classification steps and/or the pulverization steps, in particular, at least the classification steps, in parallel, properties are enhanced more, by multiple division of a classification mesh having the same area, for example, from one sieve with 1 m$^2$ to two sieves with 0.5 m$^2$ and thus it is preferable. It should be noted that, in FIG. 12, the pulverization apparatuses (c1, c2) are used in combination in series, and the water-absorbing resin is equally divided to two portions after the pulverization step c1, and the pulverization step c2 (the pulverization apparatus c2) and the classification step d (the classification apparatus d) are set as two lines in parallel.

In the production method of the present invention, from the viewpoint of enhancement and stabilization of properties of the water-absorbing resin, preferably at least one of the pulverization step, the classification step and the surface cross-linking step is set two or more lines, relative to one line of the polymerization step. "One line" in the present invention means one line which proceeds via each step from a raw material (a monomer), to obtain polymer gel, the water-absorbing resin (including a fine powder product recovered), a particulate water-absorbing agent, and a final product. In the case where the line branches to two, it is called "two lines". In other words, "two or more lines" means an embodiment for installing two or more units of apparatuses in parallel, in the same step, to operate at the same time or alternatively. Typically, by branching the classification step to two or more lines, properties can be enhanced more.

In the present invention, in the case where each step including the classification step or the like is set in 2 or more lines, the upper limit for each step is about 10 lines, and among them, preferably 2 to 4 lines, still more preferably 2 to 3 lines, and particularly preferably 2 lines. By setting the number of line within the above range, properties of the obtained water-absorbing resin is enhanced. The case of too many lines (divisions) does not provide effect of division, as well as makes operation complicated, and not economical from the viewpoint of cost, therefore 2 lines, that is, operation of 2 or more units of the same apparatuses (particularly 2 units of apparatuses) in parallel at the same time is particularly preferable.

In addition, in the above embodiment, polymer gel or the water-absorbing resin, which is a dried substance thereof, is divided to 2 or more lines at and subsequent to the drying step, and ratio of the division amount may be determined by each step, and not especially limited. For example, in the case of two divisions, it is preferably 4:6 to 6:4, more preferably 4.5:5.5 to 5.5:4.5, still more preferably 4.8:5.2 to 5.2:4.8, and most preferably 5:5. Even in the case of 3 or more lines, it is preferable that ratio of the maximum amount and the minimum amount divided to n is within the above range. It should be noted that the division operation may be a continuous-type or a batch-type, and ratio of the above division amount is specified by average amount in predetermined period of time.

In the present invention, number of lines of the surface cross-linking step is not especially limited, and an arbitrary number of lines may be selected, however, in considering plant construction cost, running cost or the like, it is preferable to be 1 line or 2 lines, in particular, 2 lines. That is, from the viewpoint of properties, it is most preferable that the surface cross-linking step, preferably still more the pulverization step and the classification step are all 2 or more lines (the upper limit is the above range), for 1 line of the polymerization step.

In addition, in the case where a plurality of apparatuses are installed in parallel in the present invention, as substitution of 1 apparatus, the apparatuses in parallel may be down sized as appropriate. Even by down-sizing processing capability of an apparatus to ½, price of the apparatus does not decrease to ½, however, it has been found that in the present invention, installment of specific apparatuses in parallel enhances properties of the obtained water-absorbing agent, decreases ratio of out of specification, thus also resulting in cost down.

It should be noted that US-A-2008/0227932 specification has disclosed a method for performing "polymerization in 2 lines" and the latter half in 1 line, US-A-2007/149760 has disclosed a technology for "connecting in series" a stirring drying apparatus and a heating treatment machine in surface cross-linking, as well as WO 2009/001954 has disclosed a technology for "connecting in series" a belt polymerization apparatus. On the contrary, in the present invention, properties enhancement and stabilization more than conventional level are attained by "arranging (substantially the same) apparatuses in parallel" in a specific step after completion of the polymerization step, relative to 1 unit of a polymerization machine.

(Division Method)

To make surface cross-linking in 2 or more lines, the present invention includes a division step, and preferably the division step of particulate hydrogel or the particulate water-absorbing resin, which is a dried substance thereof, and more preferably the division step of the particulate water-absorbing resin.

As the division method to be used, for example, the following methods (a) to (c) are used for the particulate water-absorbing resin after drying.

(a) A division method for the particulate water-absorbing resin just after storing it in a hopper. Preferably, a constant feeder for a powder is used. As the constant feeder, a circle feeder or a screw feeder or the like is used suitably.

(b) A division method for the particulate water-absorbing resin in transporting it to a plurality of hoppers using pneumatic transportation.

(c) A division method for the particulate water-absorbing resin in falling (for example, free falling).

In this case, a two-divider or a three-divider installed with a mountain or a weir is used for division. It should be noted that a JIS Riffle sampler (a two-divider) is partitioned to many small rooms and has a structure where the charged sample is allocated alternately in two directions.

For example, the following methods (d) to (f) or a method in combination thereof are used for polymer gel after polymerization, and then it is supplied to the drying steps in parallel.

(d) A division method for particulate hydrogel obtained using a kneader or a meat chopper, in falling (for example, free falling). For the division, a two-divider or a three-divider installed with a mountain or a weir and the like is used at the exit of the kneader or the meat chopper.

(e) A division method for the particulate hydrogel using the constant feeder.

(f) A cutting method for sheet-like gel obtained by belt polymerization.

Among these, it is preferable that at least the particulate water-absorbing resin after drying is divided, and to attain this, polymer gel or the particulate dried substance is divided.

It should be noted that preferable value of division ratio of the particulate water-absorbing resin or polymer gel to be divided in the above embodiment is as described above.

Among these, from the viewpoint of constant feeding properties, the methods (a) to (c) are preferably used, and the method (a) is still more preferably used.

(9) Surface Cross-Linking Step (a) Cross-Linking Agent

In the present invention, the surface cross-linking step is further included after the pulverization step under the above circulation pulverization ratio, and the classification step after drying. The production method of the present invention is applied to the production method for the water-absorbing resin with absorbency against pressure (AAP) and liquid permeability (SFC), or continuous production in a large scale (in particular, 1 [t/hr]), and in particular, to the water-absorbing resin for surface cross-linking at high temperature. The surface cross-linking may be a radical cross-linking by the addition of a polymerization initiator such as a perfulfate salt or a photopolymerization initiator, or may be polymerization cross-linking for polymerization by the simple addition of a monomer at the surface, or coating cross-linking by the addition of a water-soluble polymer and a cross-linking agent at the surface, however, surface cross-linking using a surface cross-linking agent to be described later, which is capable of reacting with a carboxyl group of polyacrylic acid, is preferably applied.

In the present invention, a covalent bonded-type surface cross-linking agent is used, and preferably, the covalent bonded-type surface cross-linking agent and an ion bonding-type surface cross-linking agent are used in combination.

(Covalent Bonded-Type Surface Cross-Linking Agent)

As the surface cross-linking agent which can be used in the present invention, various organic or inorganic cross-linking agents may be exemplified, however, a covalent bonded-type surface cross-linking agent (organic surface cross-linking agent) is preferably used. From the viewpoint of properties, preferably, as the covalent bonded-type surface cross-linking agent, there can be used a polyhydric alcohol compound, an epoxy compound, a polyvalent amine compound or a condensate thereof with a haloepoxy compound thereof, an oxazoline compound, a (mono-, di-, or poly-) oxazolidinone compound, and an alkylene carbonate compound; in particular, a dehydration reactive cross-linking agent, composed of the polyhydric alcohol compound, the alkylene carbonate compound and the oxazolidinone compound, which requires reaction at high temperature. In the case where the dehydration reactive cross-linking agent is not used, compounds which have been exemplified in U.S. Pat. Nos. 6,228,930, 6,071,976, 6,254,990 or the like are more specifically included. For example, there have been included a polyhydric alcohol compound, such as mono-, di-, tri-, tetrapropylene glycerin, 1,3-propanediol, glycol, 1,4-butanediol, 1,3-butanediol, 1,5-pentanediol, 1,6-hexanediol, sorbitol; an epoxy compound such as ethylene glycol diglycidyl ether, glycidol; an alkylene carbonate compound such as ethylene carbonate; an oxetane compound; a cyclic urea compound such as 2-imidazolidinone or the like; and the like.

(Ion Bonded-Type Surface Cross-Linking Agent)

In addition, liquid permeability or the like may be enhanced by using the ion bonded-type surface cross-linking agent (inorganic cross-linking agent), instead of or in addition to the covalent bonded-type surface cross-linking agent (organic cross-linking agent). As the ion bonded-type surface cross-linking agent to be used, there is exemplified, a salt (an organic salt or an inorganic salt) or a hydroxide of a divalent or more, preferably trivalent or tetravalent polyvalent metal. As the polyvalent metal which can be used, aluminum, zirconium, or the like are included, and as the salt of the polyvalent metal, aluminum lactate and aluminum sulfate are included. These ion bonded-type surface cross-linking agents may be used at the same time or separately with the covalent bonded-type surface cross-linking agents. Surface cross-linking using the polyvalent metal has been shown in WO 2007/121037, WO2008/09843, WO 2008/09842, U.S. Pat. Nos. 7,157,141, 6,605,673, 6,620,889, US-A-2005/0288182, US-A-2005/0070671, US-A-2007/0106013, and US-A-2006/0073969.

In addition, a polyamine polymer, in particular, the one with a weight average molecular weight of about 5000 to 1,000,000 may be used at the same time or separately, other than the above covalent bonded-type surface cross-linking agent, to enhance liquid permeability or the like. The polyamine polymer to be used has been exemplified, for example, in U.S. Pat. No. 7,098,284, WO 2006/082188, WO 2006/082189, WO 2006/082197, WO 2006/111402, WO 2006/111403, WO 2006/111404, or the like.

(b) Solvent or the Like

Used amount of the surface cross-linking agent is determined as appropriate in about 0.001 to 10 parts by weight, preferably 0.01 to 5 parts by weight, relative to 100 parts by weight of the water-absorbing resin. Preferably, water may be used in combination with the surface cross-linking agent. Amount of water to be used is in a range of 0.5 to 20 parts by weight, and preferably 0.5 to 10 parts by weight, relative to 100 parts by weight of the water-absorbing resin. Also in the case of using an inorganic surface cross-linking agent and an organic surface cross-linking agent in combination, they are used each in an amount of 0.001 to 10 parts by weight, and preferably 0.01 to 5 parts by weight.

In addition, in this case, a hydrophilic organic solvent may be used, and amount thereof is in a range of 0 to 10 parts by weight, and preferably 0 to 5 parts by weight, relative to 100 parts by weight of the water-absorbing resin. In addition, in mixing a solution of a cross-linking agent to the water-absorbing resin particle, a water-insoluble fine powder or a surfactant may be present together in a range not to inhibit the effect of the present invention, for example, in 0 to 10 parts by weight, preferably 0 to 5 parts by weight, and more preferably 0 to 1 parts by weight. A surfactant to be used or used amount thereof has been exemplified in U.S. Pat. No. 7,473,739 or the like.

(c) Mixing Apparatus

In the present invention, in mixing a surface processing agent, continuous high speed rotating stirring-type mixing machines, and among them, continuous high speed rotating stirring-type mixing machines of a horizontal-type are used suitably. It should be noted that the surface processing agent means the surface cross-linking agent or an alternative thereof (for example, a radical polymerization initiator such as a persulfate salt, and a monomer), and is a concept including a solution or a dispersion thereof. Stirring is performed at 100 to 10000 rpm, still more 300 to 2000 rpm, and residence time is preferably within 180 seconds, still more 0.1 to 60 seconds, particularly about 1 to 30 seconds.

(d) Temperature of the Water-Absorbing Resin

In the present invention, temperature of the water-absorbing resin powder (the particulate water-absorbing agent) to be supplied to the surface cross-linking step or a transportation pipeline is preferably 30° C. or higher, more preferably 40° C. or higher, and still more preferably 50° C. or higher. By maintaining the temperature of the water-absorbing resin powder (particulate water-absorbing agent) to be supplied to the transportation pipeline at predetermined temperature or higher, decrease in properties of the particulate water-absorbing agent is suppressed. Specifically, it has a significant effect to maintain properties such as saline flow conductivity (SFC).

(e) Structure of a Heating Apparatus

It should be noted that as such a continuous heating treatment machine, a horizontal-type continuous stirring apparatus or the like, provided with a charging port, an discharge port of the water-absorbing resin, a stirring means composed of one or more rotation axes having a plurality of stirring blades, and a heating means, is used. In addition, the present invention provides a production method for the acrylic acid (salt)-based water-absorbing resin, where, preferably, a cross-linking reaction is performed under condition of a stirring power index in this case of 3 to 15 [W·hr/kg]. In the present description, it is specified: (stirring power index)= ((power consumption of an apparatus in surface processing)–(power consumption in blank operation)×average residence time)/(processing amount per hour×average residence time), and by adoption of a specific apparatus and a specific parameter (stirring power index) thereof, the water-absorbing resin with superior properties can be obtained continuously and stably, even in scale up to 1 [t/hr] or more.

Stirring power index may be determined easily from power consumption of an apparatus in surface processing, and power consumption in blank operation, and when it is over 15 [W·hr/kg], properties (in particular, liquid permeability) decreases, while also when it is below 3 [W·hr/kg], properties (in particular, absorbency against pressure) decreases. Stirring power index is more preferably in a range of 4 to 13 [W·hr/kg], still more preferably 5 to 11 [W·hr/kg], 5 to 10 [W·hr/kg] and particularly preferably 5 to 9 [W·hr/kg].

(f) Operation Conditions of the Heating Apparatus

The water-absorbing resin after being added with a surface processing agent in the above mixing apparatus is subjected to heating treatment. An essential apparatus is the horizontal-type continuous stirring apparatus, and the water-absorbing resin after being mixed with the surface cross-linking agent is subjected to heating treatment, and then cooling treatment as needed. Heating temperature is 70 to 300° C., preferably 120 to 250° C., and more preferably 150 to 250° C., and heating time is preferably in a range of 1 minute to 2 hours.

Heating treatment may be performed using a usual drying machine or a heating furnace. In the present invention, even in drying with high temperature heating or air (hot air), which has conventionally caused significant coloring, the water-absorbing resin with high whiteness can be provided. In particular, in the case of aiming at a sanitary material (in particular, the disposable diapers), by such surface cross-linking, it is enough to enhance absorbency against pressure (AAP) up to a range which will be described later, preferably 20 [g/g] or higher, and still more about 23 to 30 [g/g].

(g) Cooling Step and the Second Classification Step

The cooling step is a step performed arbitrarily after the surface processing step, and the cooling step can be used, in the case of using a dewatering reactive cross-linking agent, which requires a reaction preferably at high temperature, composed of a polyvalent alcohol compound, an alkylene carbonate compound, and an oxazolidinone compound.

The cooling apparatus to be used in this cooling step is not especially limited, and it may be the above horizontal-type continuous stirring apparatuses to be used in the heating treatment, or a two axes stirring drying machine, for example, having cooling water passed through the inside of the inner wall and other heat conduction plane, exemplified in U.S. Pat. No. 7,378,453 or the like, may be used. In addition, temperature of this cooling water is set at below the heating temperature in the surface processing step, and preferably at 25° C. or higher and below 80° C.

(10) Other Steps

As other than the above steps, a recycling step of an evaporated monomer, a granulation step, and a fine powder removal step, or the like may be installed, as needed. Still more, to reduce coloring over time or to prevent gel deterioration or the like, the additives to be described later may be used in the monomer or a polymer thereof.

[3] Properties of the Water-Absorbing Resin (1) Properties of the Water-Absorbing Resin In the case of aiming at sanitary materials, in particular, disposable diapers, it is preferable to control by the above polymerization or surface cross-linking, so as to satisfy at least one of the following features (a) to (e), still more two or more including AAP, and particularly preferably three or more including AAP. The case, where the following features are not satisfied, may not exert sufficient performance in high concentration disposable diapers to be described later.

The production method of the present invention is applicable suitably to the production method of the following water-absorbing resin, and preferably applicable to control and enhance liquid permeability (SFC) or water-absorbing speed (FSR). It should be noted that, unless otherwise specified, properties of the following and in Examples are specified by the EDANA method.

(a) Absorbency Against Pressure (AAP)

To prevent leakage in disposable diapers, using the above polymerization as an example of an attainment means, it is controlled so as to attain an absorbency (AAP) of preferably 20 [g/g] or higher, more preferably 22 [g/g] or higher, still more preferably 24 [g/g] or higher, for the 0.9% by weight sodium chloride aqueous solution, against a pressure of 1.9 kPa, still more against a pressure of 4.8 kPa.

(b) Liquid Permeability (SFC)

To prevent leakage in disposable diapers, using the above polymerization as an example of an attainment means, it is controlled so as to attain flow conductivity of 0.69% by weight sodium chloride aqueous solution (SFC), which is a liquid permeability characteristics against pressure, of 1 [×$10^{-7}$·cm$^3$·s·g$^{-1}$] or higher, preferably 20 [×$10^{-7}$·cm$^3$·s·g$^{-1}$] or higher, more preferably 50 [×$10^{-7}$·cm$^3$·s·g$^{-1}$] or higher, still more preferably 70 [×$10^{-7}$·cm$^3$·s·g$^{-1}$] or higher, and particularly preferably 100 [×$10^{-7}$·cm$^3$·s·g$^{-1}$] or higher. A measurement method for SFC is well known, and has been described, for example, in U.S. Pat. No. 5,562,646.

According to the present invention, because significant enhancement effect of liquid permeability is exerted, among them, enhancement of SFC, in particular, enhancement of SFC up to the above range, in particular, enhancement of SFC up to 20 [×cm$^3$·s·$10^{-7}$·g$^{-1}$] or higher, the present method is suitably applicable for the production method for the water-absorbing resin with such high liquid permeability.

(c) Absorption Capacity without Load (CRC)

Absorption capacity without load (CRC) is controlled so as to attain preferably 10 [g/g] or higher, more preferably 20 [g/g] or higher, still more preferably 25 [g/g] or higher, and particularly preferably 30 [g/g] or higher. The higher CRC is the better, and the upper limit value is not especially limited, however, from the viewpoint of balance with other properties, it is preferably 50 [g/g] or lower, more preferably 45 [g/g] or lower, and still more preferably 40 [g/g] or lower.

(d) Water Soluble Amount (Extractables)

The water soluble amount is preferably 0 to 35% by weight or lower, more preferably 25% by weight or lower, still more preferably 15% by weight or lower, and particularly preferably 10% by weight or lower.

(e) Residual Monomer Amount

Using the above polymerization as one example of an attainment means, residual monomer amount is shown to be usually 500 ppm or lower, preferably 0 to 400 ppm, more preferably 0 to 300 ppm, and particularly preferably 0 to 200 ppm relative to 100% by weight of the water-absorbing resin.

(f) Water-Absorbing Speed (FSR)

Water-absorbing speed (FSR) of 1 g of the water-absorbing resin to 20 g of a normal saline solution is usually 0.05 [g/g/sec] or higher, 0.1 [g/g/sec] or higher, usually 0.15 [g/g/sec] or higher, 0.20 [g/g/sec] or higher, and still more 0.25 [g/g/sec] or higher, (up to 0.50). The upper limit is enough at 0.1 [g/g/sec]. A measurement method for FSR has been specified in WO 2009/016055.

(g) Amount of Increase in Fine Powder Before and after Damage (Damage Resistance)

Amount of increase in fine powder before and after damage (amount of increase in the substance passed through 150 μm) specified by a measurement method of Example is preferably 3% by weight or lower, and still more 1.5% by weight or lower. Such a range provides no problem of properties decrease in practical use such as in production of the disposable diapers or the like.

(2) Other Additives

Still more, in response to use objects, an oxidizing agent, an antioxidant, water, a polyvalent metal compound, water-insoluble inorganic or organic powder such as silica, metal soap or the like, deodorant, an antibacterial agent, polyamine polymer, pulp or thermoplastic fiber or the like may be added to the water-absorbing resin, in an amount of 0 to 3% by weight, preferably 0 to 1% by weight in 100% by weight of the water-absorbing resin.

(3) Intended Use

Applications of the water-absorbing resin of the present invention are not especially limited, however, it may be preferably used in absorbent articles such as disposable diapers, sanitary napkins, incontinent pads. In particular, when it is used in high concentration diapers (those using a large quantity of the water-absorbing resin in one sheet of the diaper), wherein odor or coloring or the like derived from raw materials has conventionally been a problem, in particular, in the case where it is used in the upper layer part of an absorbing body in the absorbent article, particularly superior performance is exerted.

Effect of the present invention is exerted, when content of the water-absorbing resin (core concentration) in the absorbing body, containing arbitrarily other absorbent material (pulp fiber or the like), in this absorbing articles, is 30 to 100% by weight, preferably 40 to 100% by weight, more preferably 50 to 100% by weight, still more preferably 60 to 100% by weight, particularly preferably 70 to 100% by weight, and most preferably 75 to 95% by weight. For example, when the water-absorbing resin of the present invention is used in the above concentration, in particular, in the upper layer part of an absorbing body, due to superior liquid permeability (liquid permeability against pressure), diffusion properties of absorbent fluid such as urine is superior, therefore, such absorbent articles can be provided as having not only enhanced absorption amount of the whole absorbent article, due to efficient liquid distribution of absorbent articles such as disposable diapers, but also maintaining a white state showing good sanitary feeling of the absorbing body.

EXAMPLES

Explanation will be given below on the present invention in accordance with Examples, however, the present invention should not be construed limitedly by Examples. In addition, various properties described in claims and Examples of the present invention were determined according to EDANA methods and the following measurement methods.

<Measurement Methods for Particle Diameter (D50) and Logarithmic Standard Deviation (σζ) of Particle Size Distribution>

Measurement of particle diameter was performed in accordance with measurement of weight average particle diameter (D50) described in WO 2004/69915.

The water-absorbing resin after pulverization was sieved with standard JIS sieves each having a sieve mesh size of 710 μm, 600 μm, 500 μm, 300 μm, 150 μm, and 45 μm, to plot residual percent, R, on logarithmic probability paper. Each point plotted was connected by a straight line, from which weight average particle diameter (D50) was read.

In addition, logarithmic standard deviation (σζ) is represented by the following equation, provided that X1 is particle diameter at R=84.1% by weight and X2 is particle diameter at R=15.9% by weight, and the smaller value of σζ means the narrower particle size distribution.

$$\sigma\zeta = 0.5 \times \ln(X2/X1)$$

It should be noted that, in the case of containing the water-absorbing resin having particle diameter over 850 μm, a commercial JIS standard sieve having a sieve mesh size over 850 μm is used, as appropriate.

In measurement of particle size and logarithmic standard deviation (σζ) of particle size distribution, 10.0 g of the water-absorbing resin particle was charged in the JIS standard sieves, each having a sieve mesh size of 710 μm, 600 μm, 500 μm, 300 μm, 150 μm, and 45 μm (THE IIDA TESTING SIEVE: a diameter of 8 cm), to classify for 5 minutes, using a vibration classification apparatus (IIDA SIEVE SHAKER, TYPE: ES-65, SER. No. 0501).

It should be noted that the pulverization step and the classification step are performed under reduced pressure, and still more between the pulverization step and the classification step, as well as before and after these steps are at a temperature of about 60° C. and connected by the following pneumatic transportation (a dew point of −15° C. and a temperature of about 30° C.). In addition, the water-absorbing resin powder after surface cross-linking is hereafter called the water-absorbing agent (particulate water-absorbing agent).

Example 1

A continuous production apparatus of a water-absorbing resin was used, where each apparatus at a polymerization step (stationary polymerization on a belt), a step for gel crush (crushing), a drying step, a pulverization step, a classification step, a surface cross-linking step (a spraying step of a surface cross-linking agent, a heating step), a cooling step, a particle size adjusting step, and a transportation step between each step is connected to be able to perform each step continuously. Each step may be one line or two or more lines (branched in parallel, refer to FIG. 4), and in the case where two or more lines are adopted in the following Examples, production capacity is shown by total amount of the whole lines. Production capacity of this continuous production apparatus is about 3500 kg/hr. Using this continuous production apparatus, the water-absorbing resin powder was produced continuously.

Firstly, a monomer aqueous solution (1) consisting of the following composition was prepared.

A monomer aqueous solution (1)

Acrylic acid: 193.3 parts by weight

A 48% by weight aqueous solution of sodium hydroxide: 64.4 parts by weight

Polyethyleneglycol diacrylate (an average n number of 9): 1.26 parts by weight

A 0.1% by weight aqueous solution of penta sodium ethylenediaminetetra(methylenephosphonate): 52 parts by weight Deionized water: 134 parts by weight Next, temperature of the monomer aqueous solution (1) was adjusted at 40° C. The obtained monomer aqueous solution (1) was continuously fed using a constant feed pump to perform continuous mixing of 97.1 parts by weight of the 48% by weight aqueous solution of sodium hydroxide into the monomer aqueous solution (1) using line mixing. Temperature of the monomer increased up to 85° C. by neutralization heat in this time.

Then, 8.05 parts by weight of a 4% by weight aqueous solution of sodium persulfate was continuously mixed using line mixing.

A continuously mixed substance obtained by this line mixing was supplied onto a plane belt having weirs at both ends, in a thickness of about 7.5 mm to perform polymerization continuously for 3 minutes to obtain a hydrogel-like cross-linked polymer (1).

This hydrogel-like cross-linked polymer (1) was cut continuously in a vertical direction to a travelling direction of the belt, and in nearly the same interval. Next, it was finely cut to about 1.5 mm using a meat chopper with a pore diameter of 22 mm. This finely cut gel was spread and put on a continuous transferring porous plate of a through flow band drying machine, to dry at 185° C. for 30 minutes to obtain 246 parts by weight (total discharge amount of the water-absorbing resin at the drying step) of a dried polymer (1).

By continuously supplying the whole amount of the dried polymer (1) (about 60° C.) to a three-stage roll mill for pulverization, a pulverized polymer (1) was obtained. Roll gaps of this three-stage roll mill were 0.8 m/0.65 mm/0.48 mm from the top side, in this order. Degree of reduced pressure of the pulverization step was set as 0.29 kPa.

After this pulverization step, the obtained pulverized polymer (1) (about 60° C.) was classified continuously using a sieving classification apparatus having metal sieving meshes each having a sieve mesh size of 710 μm and 175 μm, to obtain particles (A) which did not pass through the sieve of 710 μm, particles (B) passed through the sieve of 710 μm but not passed through the sieve of 175 μm, and particles (C) passed through the sieve of 175 μm. The particles (A) not passed through the sieve of 710 μm were supplied again to the three-stage roll mill for pulverization. It should be noted that degree of reduced pressure of the classification step was set at 0.11 kPa, and air having a dew point of 10° C. and a temperature of 75° C. was passed through inside the sieving apparatus in a rate of 2 [m³/hr]. Classification was performed using an oscillation-type circular sieving classification apparatus (number of vibration: 230 rpm, radial inclination (gradient): 11 mm, tangential inclination (gradient): 11 mm, amount of eccentricity: 35 mm, temperature of the apparatus: 55° C.), and the stand installed with this sieving classification apparatus was grounded (electricity removal) with a grounding resistance value of 5Ω.

Amount of the particles (A) not passed through the sieve of 710 μm, recycled this time, was 175 parts by weight. That is, total supply amount to the 3-stage roll mill was 421 parts by weight (total supply amount of the water-absorbing resin to the pulverization step), and circulation pulverization ratio was 1.71. In this way, water-absorbing resin powder (1), having a particle diameter of 710 to 175 μm, was obtained continuously.

After uniformly mixing a surface processing agent (containing the covalent-bonded-type surface cross-linking agent), as a mixed solution composed of 0.3 part by weight of 1,4-butane diol, 0.6 part by weight of propylene glycol and 3.0 parts by weight of deionized water, into 100 parts by weight of the obtained water-absorbing resin powder (1), the mixture was subjected to heating treatment at 208° C. for 40 minutes. Next, it was cooled and a mixed solution composed of 1.17 parts by weight of a 27.5% by weight of aqueous solution of aluminum sulfate (8% by weight as converted to aluminum oxide) as the ion-bonded cross-linking agent, 0.196 part by weight of a 60% by weight of aqueous solution of sodium lactate, and 0.029 part by weight of propylene glycol, was uniformly mixed.

After that, the obtained particles were crushed till passing through the JIS standard sieve with a sieve mesh size of 710 μm. It should be noted that crushing in this description is an operation to loosen an aggregate in surface cross-linking of the water-absorbing resin powder (1) having a particle diameter of 710 to 175 μm, as a substance passing through 710 μm. In this way, a water-absorbing agent (1) composed of the surface cross-linked water-absorbing resin powder (1) was obtained.

Example 2

In a similar operation as in the Example 1, the particles (C) which passed through the sieve of 175 μm were granulated, in accordance with a method of "Granulation Example 1" described in the description of U.S. Pat. No. 6,228,930 specification. This granulated substance, together with the gel crushed gel using a meat chopper, was spread and put on a transferring porous plate of a through flow band drying machine, to dry at 185° C. for 30 minutes to obtain 295 parts by weight (total discharge amount of the water-absorbing resin at the drying step) of a dried polymer (1).

At and subsequent to the drying step, the same operation as in the Example 1 was performed. In this way, a water-absorbing agent (2) composed of the surface cross-linked water-absorbing resin powder (2) was obtained. It should be noted that amount of the particles (A) which did not pass through the sieve of 710 μm, recycled this time, was 172 parts by weight. That is, total supply amount to the 3-stage roll mill was 467 parts by weight (total supply amount of the water-absorbing resin to the pulverization step), and circulation pulverization ratio was 1.58.

Example 3

In a similar operation as in the Example 1, roll mill gap was adjusted arbitrarily so that recycled amount of the particles (A) which did not pass through the sieve of 710 μm, attained 295 parts by weight (recycled amount varies depending on the sieve size or supply amount or the like, however, it is adjustable to arbitrary recycled amount by adjustment of roll mill clearance. That is, total supply amount to the 3-stage roll mill was 541 parts by weight in this time (total supply amount of the water-absorbent resin to the pulverization step), and in addition, circulation pulverization ratio was 2.20. In this way, a water-absorbing agent (3) composed of the surface cross-linked water-absorbing resin powder (3) was obtained.

Comparative Example 1

In a similar operation as in the Example 1, recycling of the particles (A) which did not pass through the sieve of 710 μm, was not performed. That is, total supply amount to the 3-stage roll mill was 246 parts by weight in this time (total supply amount of the water-absorbing resin to the pulverization step), and in addition, circulation pulverization ratio was 1.00. In this way, a comparative water-absorbing agent (1) was obtained.

Comparative Example 2

In a similar operation as in the Example 1, roll mill gap was adjusted arbitrarily so that recycled amount of the particles (A) which did not pass through the sieve of 710 μm, attained 17 parts by weight. That is, total supply amount to the 3-stage roll mill was 263 parts by weight in this time (total supply amount of the water-absorbing resin to the pulverization step), and in addition, circulation pulverization ratio was 1.07. In this way, a comparative water-absorbing agent (2) was obtained.

Comparative Example 3

In a similar operation as in the Example 1, roll mill gap was adjusted arbitrarily so that recycled amount of the particles (A) which did not pass through the sieve of 710 μm, attained 65 parts by weight. That is, total supply amount to the 3-stage roll mill was 311 parts by weight in this time (total supply amount of the water-absorbing resin to the pulverization step), and in addition, circulation pulverization ratio was 1.26. In this way, a comparative water-absorbing agent (3) was obtained.

Comparative Example 4

In a similar operation as in the Example 1, roll mill gap was adjusted arbitrarily so that recycled amount of the particles (A) which did not pass through the sieve of 710 μm, attained 120 parts by weight. That is, total supply amount to the 3-stage roll mill was 366 parts by weight in this time (total supply amount of the water-absorbing resin to the pulverization step), and in addition, circulation pulverization ratio was 1.49. In this way, a comparative water-absorbing agent (4) was obtained.

Example 7

A similar operation as in the Example 2 was performed, except that the pulverization system shown in FIG. 11 was used.

In this pulverization system, sieve mesh size of the top stage sieve of the first sieve was 15 mm, and particles (A'), which did not passe through the sieve of 15 mm, were supplied to a pulverization machine (PinMill). Next, there was a sieve with sieve mesh size of 710 μm under the sieve of 15 mm, and particles (A1) which did not pass through this net were supplied to a 3-stage roll mill. Next, there was a sieve with sieve mesh size of 175 μm under the sieve of 710 μm, and particles (B1) which did not pass through this net were supplied to the surface cross-linking step. Next, particles (C1) passed through the net having a sieve mesh size of 175 μm were supplied to the fine powder recycling step.

The particles (A1) were pulverized using the three-stage roll mill and then classified using the second sieve. The second sieve was composed of nets each having sieve mesh size of 710 μm and 175 μm from the upper stage (a net having sieve mesh size of 710 μm or larger may be present at the upper stage of the net of 710 μm. When this net is present, a substance which does not pass through this net is treated as a substance not-passed through 710 μm), and classification thereof was performed continuously to particles (A2) not passed through the sieve of 710 μm, particles (B2) passed through the sieve of 710 μm but did not passed through the sieve of 175 μm, and particles (C2) passed through the sieve with sieve mesh size of 175 μm. Among these, the particles (A2) were supplied to a 2-stage roll mill.

The particles (A2) were pulverized using the two-stage roll mill and then classified using the third sieve. The third sieve had the same composition as the second sieve, and classification was similarly performed continuously to particles (A3) which did not pass through the sieve of 710 μm, particles (B3) passed through the sieve of 710 μm but did not pass through the sieve of 175 μm, and particles (C3) passed through the sieve with sieve mesh size of 175 μm. Among these, the particles (A3) were supplied to a 1-stage roll mill.

The particles (A3) were pulverized using the 1-stage roll mill and then classified using the fourth sieve. The fourth sieve had the same composition as the third sieve, and classification was similarly performed continuously to particles (A4) which did not pass through the sieve of 710 μm, particles (B4) passed through the sieve of 710 μm but did not pass through the sieve of 175 μm, and particles (C4) passed through the sieve with sieve mesh size of 175 μm. Among these, the particles (A4) were supplied again to a 1-stage roll mill.

Roll gap of the above roll mill (clearance distance between the rolls) was adjusted so that weight ratio of each particle becomes as follows.

In the present Example, a dried polymer obtained by drying together with a granulated substance, similarly as in the Example 2, was 282.7 parts by weight (total supply amount of the water-absorbent resin at the drying step).

In addition, weight ratio of each particle was as follows: particle (A1) 7.9 parts by weight, particle (A1) 262.6 parts by weight, particle (B1) 18.4 parts by weight, particle (C1) 1.7 parts by weight, particle (A2) 127.9 parts by weight, particle (B2) 116.6 parts by weight, particle (C2) 18.1 parts by weight, particle (A3) 56.3 parts by weight, particle (B3) 61.5 parts by weight, particle (C3) 10.1 parts by weight, particle (A4) 22.5 parts by weight, particle (B4) 49.5 parts by weight, and particle (C4) 6.8 parts by weight. In addition, total supply amount of the water-absorbing resin to the pulverization system was 477.2 parts by weight, and circulation pulverization ratio was 1.69.

At and subsequent to the drying step, the same operation as in the Example 1 was performed. In this way, a water-absorbent agent (7) composed of the surface cross-linked water-absorbent resin powder substance (7) was obtained.

As above, measurement results of amount of increase in fine powder after damage was given and SFC of Examples 1 to 3, 7, and Comparative Examples 1 to 4 are shown in Table 1, and measurement results of particle size distribution are shown in Table 2.

TABLE 1

| | | circulation pulverization ratio | generation amount of fine powder after damage [wt %] | CRC [g/g] | SFC [$10^{-7} \cdot cm^3 \cdot g \cdot s^{-1}$] |
|---|---|---|---|---|---|
| Comparative Example 1 | comparative water-absorbing agent (1) | 1.00 | 3.9 | 28 | 72 |
| Comparative Example 2 | comparative water-absorbing agent (2) | 1.07 | 3.8 | 28 | 75 |
| Comparative Example 3 | comparative water-absorbing agent (3) | 1.26 | 1.5 | 28 | 89 |
| Comparative Example 4 | comparative water-absorbing agent (4) | 1.49 | 1.4 | 28 | 91 |
| Example 2 | water-absorbing agent (2) | 1.58 | 1.8 | 28 | 105 |
| Example 7 | water-absorbing agent (7) | 1.69 | 1.7 | 28 | 108 |
| Example 1 | water-absorbing agent (1) | 1.71 | 1.6 | 28 | 110 |
| Example 3 | water-absorbing agent (3) | 2.20 | 1.7 | 28 | 112 |

* [wt %] means % by weight.

TABLE 2

| | | D50 [μm] | σζ | ≧710 μm [wt %] | ≧600 μm [wt %] | ≧500 μm [wt %] | ≧300 μm [wt %] | ≧150 μm [wt %] | <150 μm [wt %] |
|---|---|---|---|---|---|---|---|---|---|
| Comparative Example 1 | comparative water-absorbing agent (1) | 394 | 0.39 | 0.0 | 6.3 | 23.5 | 42.8 | 25.8 | 1.6 |
| Comparative Example 2 | comparative water-absorbing agent (2) | 387 | 0.39 | 0.0 | 5.8 | 22.8 | 42.7 | 26.9 | 1.8 |
| Comparative Example 3 | comparative water-absorbing agent (3) | 392 | 0.39 | 0.0 | 6.5 | 23.2 | 42.6 | 26.1 | 1.6 |
| Comparative Example 4 | comparative water-absorbing agent (4) | 410 | 0.40 | 0.1 | 10.2 | 23.5 | 40.6 | 24.2 | 1.4 |
| Example 2 | water-absorbing agent (2) | 424 | 0.37 | 0.1 | 9.9 | 25.9 | 41.5 | 21.5 | 1.1 |
| Example 7 | water-absorbing agent (7) | 434 | 0.36 | 0.0 | 10.7 | 27.0 | 41.8 | 19.6 | 0.9 |
| Example 1 | water-absorbing agent (1) | 431 | 0.37 | 0.1 | 10.5 | 26.8 | 40.8 | 20.8 | 1.0 |
| Example 3 | water-absorbing agent (3) | 436 | 0.36 | 0.1 | 11.0 | 27.1 | 41.4 | 19.5 | 0.9 |

* [wt %] means % by weight.

As shown in Table 1, Examples 1 to 3, 7 show a lower amount of increase in fine powder after damage, as compared with Comparative Examples 1 to 2, and also gave superior result in liquid permeability (SFC) as compared with Comparative Examples 3 to 4. That is, it is understood that, by setting circulation pulverization ratio as larger than 1.50, and further larger than 1.50 and not more than 3.00, a water-absorbing agent having strong damage resistance, as well as superior liquid permeability (SFC) can be obtained.

<Amount of Increase in Fine Powder after Damage>

As for the water-absorbing agent obtained in Examples or the comparative water-absorbing agent obtained in Comparative Examples, the following paint shaker test 1 was performed, and they were classified using the JIS standard sieve with a sieve mesh size of 150 μm to measure amount of increase in particles having a particle diameter of 150 μm or smaller, before and after the test.

[Paint Shaker Test]

The paint shaker test (PS-test) is the one for shaking 30 g of the water-absorbing resin or a water-absorbing agent, by putting, together with 10 g of glass beads with a diameter of 6 mm, into a glass container with a diameter of 6 cm and a height 11 cm, and attaching a paint shaker (Product No. 488, manufactured by Toyo Seiki Seisaku-syo, Ltd.), at a rate of 800 cycle/minute (CPM), detail of which has been disclosed in JP-A-9-235378.

The paint shaker test 1 and the paint shaker test 2 are defined as the one where shaking period was set at 30 minutes and 10 minutes, respectively. A water-absorbing agent given damage is obtained by removing glass beads using the JIS standard sieve with a sieve mesh size of 2 mm, after shaking.

Examples 4 to 6 and 8, and Comparative Examples 5 to 8

As for each water-absorbing resin powder (a powder before surface cross-linking processing) obtained in the experiment operation of Examples 1 to 3, 7 and Comparative Examples 1 to 4, a similar classification operation was performed as in the measurement of particle size distribution, and by adjusting the powder of each fraction classified to attain particle size distribution to be described later, the water-absorbing resin powder having the same particle size distribution was prepared.

These water-absorbing resin powder was subjected to surface cross-linking processing similarly as in the Example 1, to obtain water-absorbing agents and comparative water-absorbing agents corresponding to each of Examples and Comparative Examples where only particle size distribution was changed.

Particle size distribution adjusted was as follows:

| | |
|---|---|
| Not passed through 710 μm | 0% by weight |
| Not passed through 600 μm | 6.5% by weight |
| Not passed through 500 μm | 23.2% by weight |
| Not passed through 300 μm | 42.6% by weight |
| Not passed through 150 μm | 26.1% by weight |
| Below 150 μm | 1.6% by weight |

Measurement values of amount of increase in fine powder after damage was given and CRC/SFC of Examples 4 to 6, 8 and Comparative Examples 5 to 8 are shown in Table 3.

TABLE 3

Properties after adjustment of particle size distribution (properties comparison at the same particle size)

| | | water-absorbing resin powder used in adjusting particle size distribution | circulation pulverization ratio | generation amount fine powder after damage [wt %] | CRC [g/g] | SFC [$10^{-7} \cdot cm^3 \cdot g \cdot s^{-1}$] |
|---|---|---|---|---|---|---|
| Comparative Example 5 | comparative water-absorbing agent (5) | Comparative Example 1 | 1.00 | 3.8 | 28 | 73 |
| Comparative Example 6 | comparative water-absorbing agent (6) | Comparative Example 2 | 1.07 | 3.8 | 28 | 74 |
| Comparative Example 7 | comparative water-absorbing agent (7) | Comparative Example 3 | 1.26 | 1.9 | 28 | 89 |
| Comparative Example 8 | comparative water-absorbing agent (8) | Comparative Example 4 | 1.49 | 1.4 | 28 | 90 |
| Example 5 | water-absorbing agent (5) | Example 2 | 1.58 | 1.8 | 28 | 104 |
| Example 8 | water-absorbing agent (8) | Example 7 | 1.69 | 1.7 | 28 | 106 |
| Example 4 | water-absorbing agent (4) | Example 1 | 1.71 | 1.6 | 28 | 107 |
| Example 6 | water-absorbing agent (6) | Example 3 | 2.20 | 1.6 | 28 | 110 |

* [wt %] means % by weight.

As shown in Table 3, even when compared in the same particle size distribution, Examples 4 to 6 show lower amount of increase in fine powder after damage, as compared with Comparative Examples 5 to 6, and also gave superior result in SFC as compared with Comparative Examples 7 to 8. That is, it is understood that, even for those having the same particle size distribution, by setting circulation pulverization ratio as larger than 1.50, and still more over 1.50 and not more than 3.00, a water-absorbing agent having strong damage resistance, as well as superior SFC can be obtained. Liquid permeability (e.g., SFC) is generally increased as the particle size becomes larger. However, when the particle size is made larger in order to enhance liquid permeability, water-absorbing rate tends to decrease due to decrease in surface area. That is, there is a tendency for liquid permeability and water-absorbing rate to be a trade-off, but the present invention solves such a problem, i.e., can enhance the liquid permeability (SFC), while maintaining the particle size distribution (without making particles larger).

Example 9

The water-absorbing agent (2) obtained in the Example 2 was packaged by pneumatic transportation in a pipeline (surface roughness; Rz is 200 nm) using compressed air having a dew point of −15° C. and a temperature of 35° C. Decreased ratio of SFC by pneumatic transportation was 1.8%.

Example 10

Pneumatic transportation was performed similarly as in the Example 9, except that the dew point was set at 20° C. Decreased ratio of SFC by pneumatic transportation was 4.8%. From Example 9 and Example 10, it is understood that the dew point of specific value or lower is preferable.

Example 11

In the Example 2, the pulverization step and subsequent steps were set at two-lines, in accordance with FIG. 12. As a result, classification efficiency was enhanced and fine powder (a substance passed through 150 μm was 1.1% by weight), which is also an inhibition factor of liquid permeation, decreased by about half. In addition, also in the case where the classification step was set at two-lines, classification efficiency was enhanced and fine powder decreased by about half similarly.

(Summary)

As is clear from comparison of Examples with Comparative Examples, by controlling circulation pulverization ratio, liquid permeation (SFC) or damage resistance enhances.

An enhancement method for water-absorbing speed by PATENT LITERATURES 25 to 49, as conventional technology, has not noticed on the pulverization step or the classification step, and has not suggested the present invention by control of circulation pulverization ratio. In addition, PATENT LITERATURES 1 to 5 or PATENT LITERATURES 50 to 55 have disclosed a pulverization method or a classification method for the water-absorbing resin, and a removal method for the non-dried substance, however, have not disclosed a circulation pulverization ratio of 1.10 or higher, and have not suggested the problem or the effect of the present application.

INDUSTRIAL APPLICABILITY

The present invention enhances and stabilizes properties of the water-absorbing resin, for example, liquid permeability or damage resistance.
Description of Reference Numerals
c Pulverization step
c-1, c-2 Pulverization apparatus
d Classification step (Classification apparatus)

The invention claimed is:

1. A method for producing water-absorbing resin powder, comprising sequentially:
a polymerization step for polymerizing an aqueous solution of acrylic acid (salt) to obtain a hydrogel-like cross-linked polymer;
a drying step for drying the obtained hydrogel-like cross-linked polymer to obtain a dried polymer;
a pulverization step for pulverizing the obtained dried polymer with a pulverizing means to obtain a pulverized polymer;
a classification step for classifying the obtained pulverized polymer to obtain a classified polymer; and
a surface cross-linking step for surface cross-linking the obtained classified polymer;
characterized in that,
at least a part of the classified polymer is supplied again to the same or a different pulverization step, before the surface cross-linking step,
wherein circulation pulverization ratio in the pulverization step, represented by the following equation is larger than 1.50:

(Circulation pulverization ratio)=(total supply amount of the water-absorbing resin to the pulverization step)/(total discharge amount of the water-absorbing resin at the drying step);   [EXPRESSION 1]

wherein (total supply amount of the water-absorbing resin to the pulverization step)=(total discharge amount of the water-absorbing resin at the drying step)+(amount of the classified polymer supplied again to the same or different pulverization step).

2. The method according to claim 1, wherein the classified polymer is supplied again to the same pulverization step before the classification step.

3. The method according to claim 1, wherein the classified polymer is supplied to a different classification step via a different pulverization step.

4. The method according to claim 1, wherein the pulverization step is performed under reduced pressure.

5. The method according to claim 1, wherein the pulverization means is a roll-type pulverization machine.

6. The method according to claim 1, wherein the roll-type pulverization machine and another pulverization machine are used in combination as the pulverization means.

7. The method according to claim 1, wherein three or more kinds of sieves with different sieve mesh size are used in the classification step.

8. The method according to claim 1, wherein electricity is removed from the classification step or the pulverization step.

9. The method according to claim 1, wherein at least one of the pulverization step, the classification step and the surface cross-linking step is two or more lines per one line of the polymerization step.

10. The method according to claim 1, wherein the pulverization step, the classification step and at least a part before and after these steps are connected by pneumatic transportation and carrying is performed at a temperature of a dew point of −5° C. or lower.

11. The method according to claim 1, wherein a covalent bonded-type surface cross-linking agent and an ion bonded-type surface cross-linking agent are used in combination simultaneously or separately in the surface cross-linking step.

12. The method according to claim 1, wherein water content of the dried polymer is 8% by weight or less.

13. The method according to claim 1, further comprising a step for recycling water-absorbing resin fine powder generating in the classification step, to or before the drying step.

14. The method according to claim 1, wherein the method is carried out as a continuous production with a production amount per unit time of 1 [t/hr] or more.

15. The method according to claim 1, wherein water-absorbing speed (specified by FSR) of the obtained water-absorbing resin powder is 0.25 [g/g/sec] or more.

16. The method according to claim 1, wherein liquid permeability (specified by SFC) of the obtained water-absorbing resin powder is 20 $[\times 10^{-7} \cdot cm^3 \cdot g \cdot s^{-1}]$ or more.

17. The method according to claim 1, wherein ratio of particles with a particle diameter of 850 to 150 μm is 95% by weight or more, in the classified polymer to be supplied to the surface cross-linking step.

18. The method according to claim 1, wherein the classified polymer is directly supplied to the pulverization step.

19. The method according to claim 1, wherein the polymerization step and the subsequent steps are connected to provide a continuous step.

20. The method according to claim 1, wherein the pulverization step and the classification step are performed at a temperature of 40 to 100° C.

21. The method according to claim 1, wherein a plurality of the pulverization steps and a plurality of the classification steps are connected in series, and non-passed through substance having objective particle size via the classification steps are supplied to a different pulverization step.

22. The method according to claim 1, wherein the classification step is performed with a mesh sieve and the pulverization step is performed with a roll-type pulverization machine.

* * * * *